(12) United States Patent
Cohen

(10) Patent No.: US 7,175,113 B2
(45) Date of Patent: *Feb. 13, 2007

(54) DRIP IRRIGATION HOSE AND METHOD FOR MAKING SAME

(76) Inventor: Amir Cohen, Yuvalim, 20142 Doar Na Misgav (IL)

(*) Notice: Subject to any disclaimer, the term of this patent is extended or adjusted under 35 U.S.C. 154(b) by 204 days.

This patent is subject to a terminal disclaimer.

(21) Appl. No.: 10/851,132

(22) Filed: May 24, 2004

(65) Prior Publication Data
US 2005/0258278 A1  Nov. 24, 2005

Related U.S. Application Data

(63) Continuation-in-part of application No. PCT/IL02/00953, filed on Nov. 26, 2002.

(60) Provisional application No. 60/332,568, filed on Nov. 26, 2001.

(51) Int. Cl.
*B05B 15/00* (2006.01)
*B05B 1/14* (2006.01)

(52) U.S. Cl. ............ 239/542; 239/547; 239/450; 239/533.1; 239/533.13; 239/568

(58) Field of Classification Search ........... 239/542, 239/547, 533.13, 450, 533.1, 568; 138/26, 138/28, 42–46; 156/2.3, 218, 244.11, 242, 156/210.1
See application file for complete search history.

(56) References Cited

U.S. PATENT DOCUMENTS

| 6,371,390 | B1* | 4/2002 | Cohen .................. 239/542 |
| 6,561,443 | B2* | 5/2003 | Delmer ................. 239/542 |
| 6,568,607 | B2* | 5/2003 | Boswell et al. ........ 239/542 |
| 6,886,761 | B2* | 5/2005 | Cohen .................. 239/542 |

* cited by examiner

*Primary Examiner*—Dinh Q. Nguyen

(57) ABSTRACT

A drip irrigation hose includes a plurality of emitter elements secured to a tube at longitudinally-spaced locations to define, with an inner surface of the tube, a plurality of labyrinths each having an inlet in communication with the interior of the tube, and an outlet in communication with a tube outlet for discharging water from the tube outlet at a slow rate. The labyrinths are defined by a continuous strip of a relatively inelastic material bonded to the inner surface of the tube, and a formation of a relatively elastic material shaped to define at least the tips of a group of teeth for each of the emitter elements producing, with the inner surface of the tube a turbulent flow passageway at each of the longitudinally spaced locations along the length of the tube. In some embodiments the drip irrigation hose is formed with a clearance between the inner surface of the tube and the teeth normally bypassing at least a part of each labyrinth in the non-pressurized condition of the tube, which clearance is closed in the pressurized condition of the tube to render the labyrinths effective to regulate the flow therethrough in response to pressure.

40 Claims, 21 Drawing Sheets

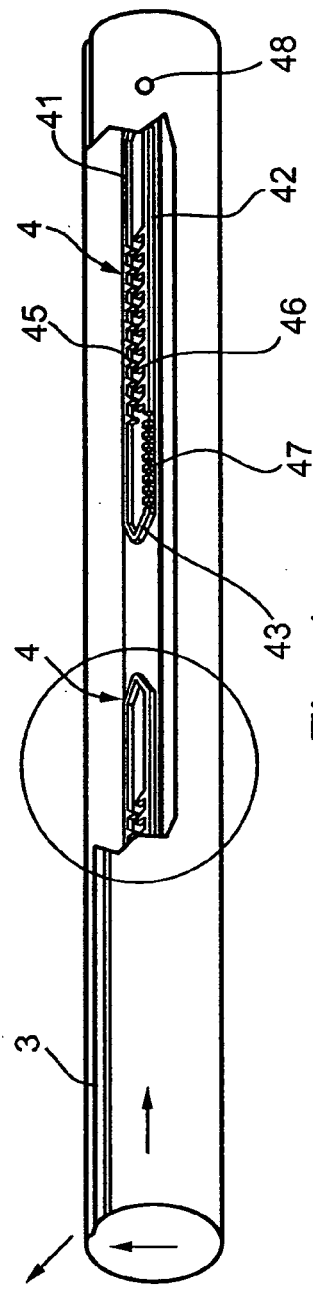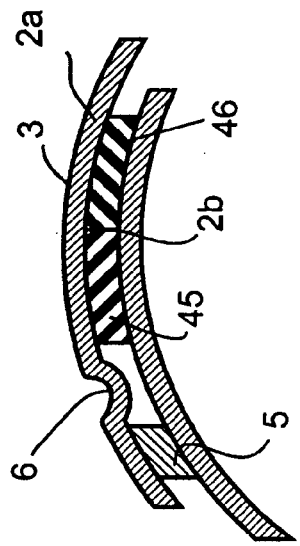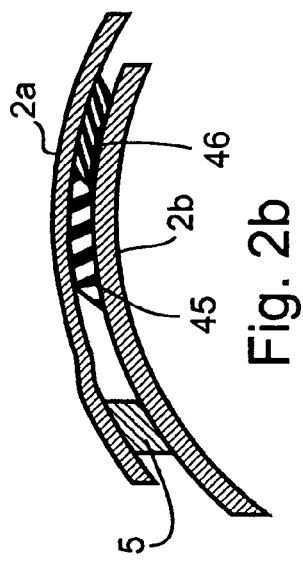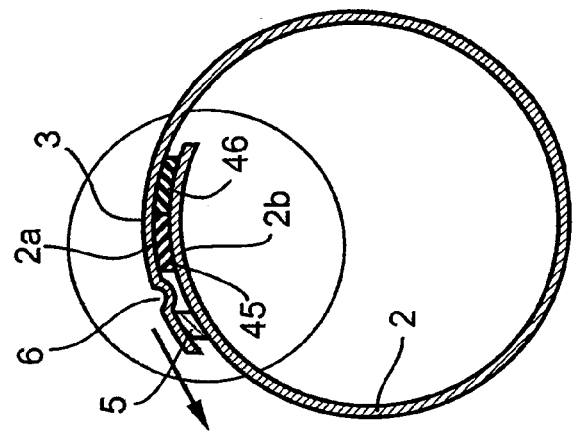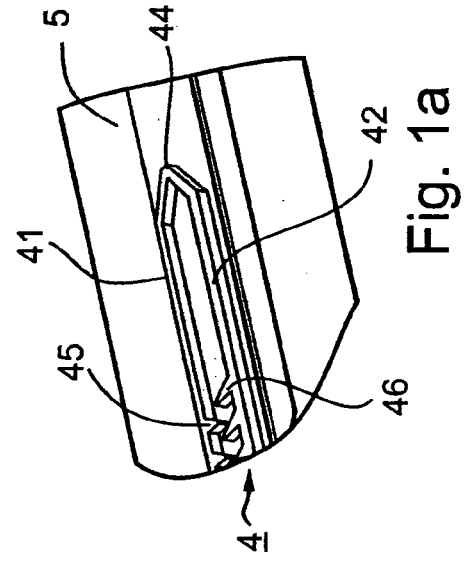

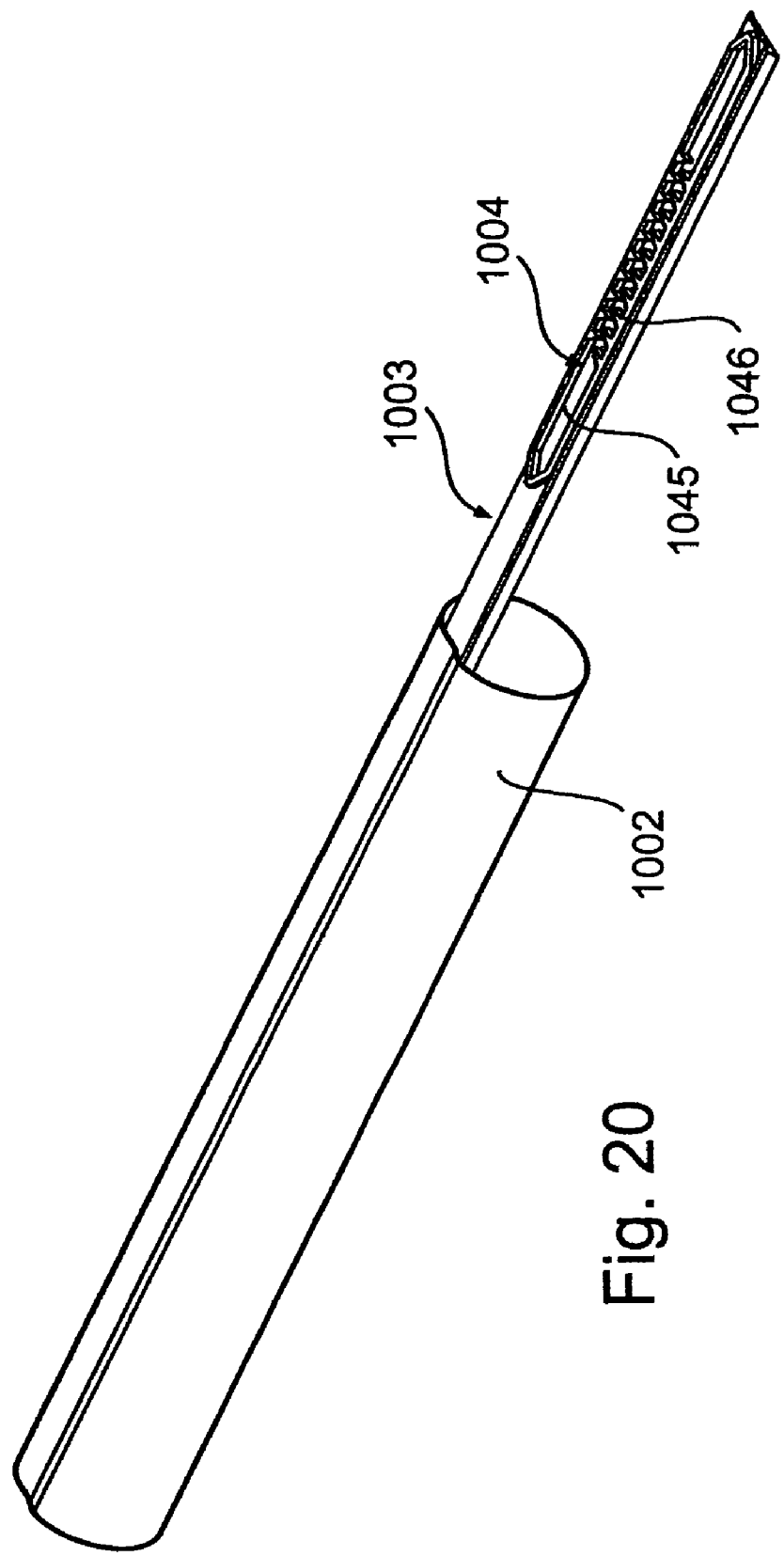

DRIP IRRIGATION HOSE AND METHOD FOR MAKING SAME

RELATED APPLICATIONS

The present application is a continuation-in-part of International Patent Application PCT/IL02/00953, filed Nov. 26, 2002, which application claims priority from U.S. Provisional Patent Application No. 60/332,568 filed Nov. 26, 2001 which application includes subject matter of U.S. application Ser. No. 10/197,433 of Jul. 18, 2002, which application is a continuation-in-part of U.S. application Ser. No. 09/639,768 filed Aug. 21, 2000, now U.S. Pat. No. 6,371,390. The contents of the above International Publication and U.S. patent are incorporated herein by reference.

FIELD AND BACKGROUND OF THE INVENTION

The present invention relates to drip irrigation hoses and to methods for making such hoses.

Drip irrigation hoses are increasingly being used for irrigating various types of plants since they supply the water directly to the root regions of the plants, and therefore are highly conservative of water resources. One type of irrigation hose is constructed by simultaneously extruding a plastic hose and bonding to its inner surface a plurality of emitter elements, or a strip of emitters, spaced longitudinally of the hose for discharging the water at a slow rate via discharge openings formed in the hose. Another type includes a sheet of flexible plastic material formed into a seamed hose, with the emitter elements bonded within the seam, or to another part of the hose, for discharging the water at a slow rate through discharge openings in the hose. The present invention is applicable to both types of drip irrigation hoses.

Examples of drip irrigation hoses of these types are described in U.S. Pat. Nos. 4,196,853; 5,163,622; 5,183,208; 5,203,503; 5,246,171; 5,333,793; 5,522,551; 5,620,143; 5,695,127; 5,785,785 and 6,027,048.

One problem in using drip irrigation hoses is the difficulty in ensuring relatively uniform discharge rates along the length of the hose. This problem is particularly acute where extremely long lengths of the hose are used since the hose itself produces a pressure drop along its length tending to decrease the discharge rate of the emitters at the end of the hose. This sensitivity of the discharge rate to the water pressure is also a problem where the land being irrigated is not flat and even.

Another problem with such drip irrigation hoses is sensitivity to clogging and the difficulty in dislodging clogging particles.

Both of the above problems are addressed by the drip irrigation hoses described in the above-cited patents. Generally, one or both problems is dealt with by providing each emitter element of the hose with a deformable member, such as a deformable membrane, which deforms in response to pressure to provide pressure-compensation. One known drip irrigation hose includes a continuous strip of relatively elastic material bonded to the inner surface of the tube to define a plurality of labyrinths each having an inlet communicating with the interior of the tube and an outlet communicating with an opening through the tube serving as the discharged outlet.

However, drip irrigation hoses are frequently used for only a single season, or for relatively few seasons. Accordingly, the cost involved in producing such drip irrigation hoses is a significant factor in their use. The known drip irrigation hoses addressed to one or both of the above problems are generally relatively costly to manufacture and/or use relative costly materials.

The known drip irrigation hoses also exhibit a tendency to leak water when the hose is not at its normally-operative pressure, e.g., when initially filling the hose or emptying the hose. Such leakage can result in considerable water wastage particularly where the irrigation system is intermittently operated as commonly done today.

The above-cited U.S. Pat. No. 6,371,390, discloses a drip irrigation hose comprising a tube for conducting pressurized water through its interior and formed with a plurality of tube outlets for discharging the water at longitudinally-spaced locations along the length of the tube; and a plurality of emitter elements secured to the tube at longitudinally-spaced locations along its length to define, with an inner surface of the tube, a plurality of labyrinths each having an inlet in communication with the interior of the tube and an outlet communication with a tube outlet for discharging water from the tube outlet at a slow rate. The labyrinths are defined by a continuous strip of a relatively inelastic material bonded to the inner surface of the tube, and a formation of a relatively elastic material shaped to define a group of teeth for each of the emitter elements producing, with the inner surface of the tube, turbulent flow passageways at each of the longitudinally spaced locations along the length of the continuous strip. That application described a number of constructions of such drip irrigation hoses, as well as methods and apparatus for making such hoses.

The present invention involves further variations in the construction of such drip irrigation hoses and methods of making such hoses. For the sake of brevity, however, the complete description in the above-cited U.S. Pat. No. 6,371,390 is not reproduced herein but rather is incorporated herein by reference.

OBJECTS AND BRIEF SUMMARY OF THE PRESENT INVENTION

An object of the present invention is to provide further constructions of drip irrigation hoses, and methods of making such hoses, having a number of important advantages especially in one or more of the above respects as will be described more particularly below.

The present invention relates to drip irrigation hoses which comprise a tube for conducting pressurized water through its interior and formed with a plurality of tube outlets for discharging water at longitudinally-spaced locations along the length of the tube; and a plurality of emitter elements secured within the tube at longitudinally-spaced locations along its length to define a plurality of labyrinths each having an inlet end in communication with the interior of the tube, and an outlet end in communication with a the tube outlet for discharging water therefrom at a slow rate.

According to one aspect of the present invention, the plurality of emitter elements include a relatively elastic material shaped in the form of at least the tips of a plurality of groups of teeth, each group defining a the labyrinth at each of the longitudinally spaced locations along the length of the tube; the plurality of emitter elements further including a continuous strip of a relatively inelastic material shaped to define at least an outlet passageway for each labyrinth connecting its outlet end to a the tube outlet for discharging the water therefrom.

According to another aspect of the present invention, the plurality of emitter elements include a continuous strip of a relatively inelastic material bonded to an inner surface of the tube, and a relatively elastic material shaped to define at least the tips of teeth of a labyrinth at each of the longitudinally spaced locations along the length of the tube; the relatively elastic material being formed with an opening therethrough for each of the labyrinths, each of the openings being located between the emitter inlet and the tube outlet for the respective labyrinth; each of the latter openings automatically opening when the water pressure within the tube at the respective labyrinth reaches a predetermined minimum.

According to a further aspect of the present invention, the plurality of emitter elements include a continuous strip of a relatively elastic material; the continuous strip being further formed with a rib of the relatively elastic material for each labyrinth in the flow path from the respective emitter inlet to the respective tube outlet; each of the ribs being formed with a slit which automatically opens when the water pressure within the tube at the respective labyrinth reaches a predetermined minimum to permit flow from the respective emitter inlet to the respective tube outlet.

Such a construction enables water wastage due to leakage to be substantially reduced, particularly where the irrigation system is intermittently operated for relatively short periods, rather than continuously operated for relatively long periods. In addition, the irrigation line tends to remain full during periods of non-operation, so as to decrease the time of pressure build-up for proper operation.

While it is preferred that, in the normal non-pressurized condition of the tube, the slit be completely closed to prevent any water wastage, complete closure is not essential as some water wastage can usually be tolerated.

According to yet another aspect of the present invention, there is provided a method of making a drip irrigation hose including a tube for conducting pressurized water through the interior of the tube and formed with a plurality of tube outlets for discharging the water at longitudinally-spaced locations along the length of the tube; and a plurality of emitter elements secured to said tube at longitudinally-spaced locations along its length to define, with an inner surface of said tube, a plurality of labyrinths each having an inlet in communication with the interior of the tube and an outlet in communication with a tube outlet for discharging water from the tube outlet at a slow rate; said method comprising: forming a continuous strip with a plurality of groups of teeth to define said plurality of labyrinths with the inner surface of said tube, when secured thereto, and also to define a rib in the flow path of each labyrinth from the respective labyrinth inlet to the respective tube outlet; forming a slit in each of said ribs configured so as to automatically open with an increase in water pressure therein at the respective labyrinth; and bonding said continuous strip to the inner surface of said tube.

Further features and advantages of the invention will be apparent from the description below.

BRIEF DESCRIPTION OF THE DRAWINGS

The invention is herein described, by way of example only, with reference to the accompanying drawings, wherein:

FIGS. 1, 1*a*, 2, 2*a* and 2*b* are correspondingly-numbered views taken from the above-identified U.S. Pat. No. 6,371,390 illustrating one form of drip irrigation hose constructed in accordance with the invention of that application;

FIG. 3*a* is an enlarged fragmentary view of FIG. 3 showing the bypass clearance in the non-pressurized condition of the hose, whereas

FIGS. 6*a* and 6*b* are enlarged fragmentary views of parts of the apparatus of FIG. 6;

FIG. 7*a* is an enlarged fragmentary view illustrating a part of the apparatus of FIG. 7;

Figure 18:
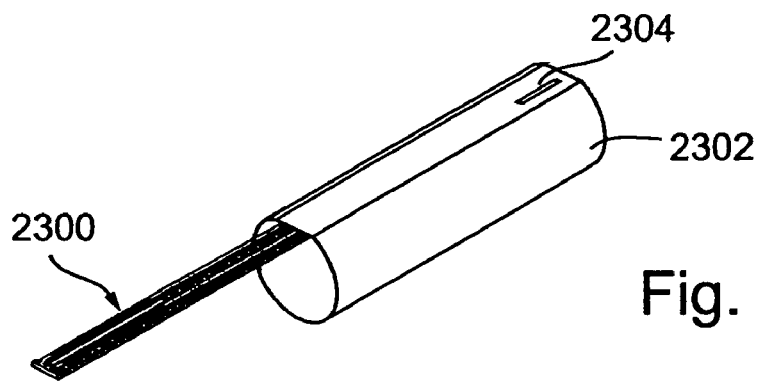
FIG. 18 is a fragmentary view illustrating another drip irrigation hose constructed in accordance with the invention, FIG. 18*a* being a transverse sectional view of FIG. 18, FIG.
Figure 18A:
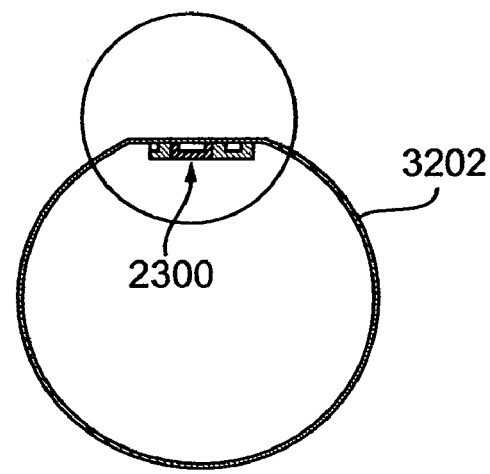
Figure 18B:
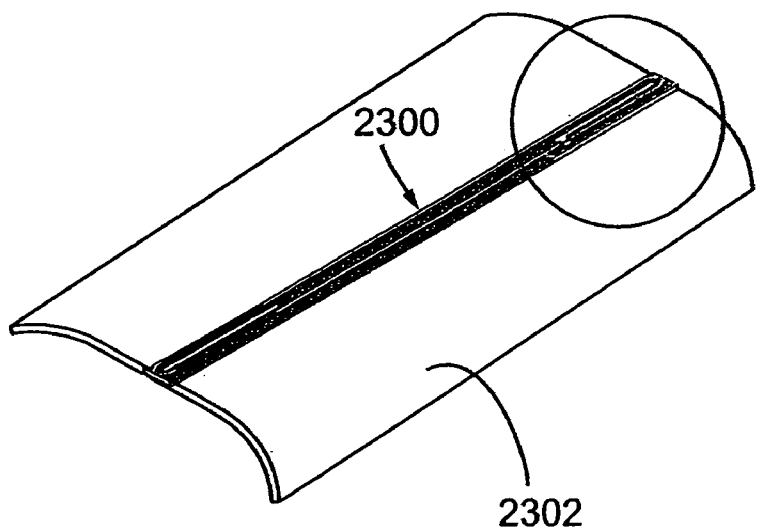
Figure 18C:
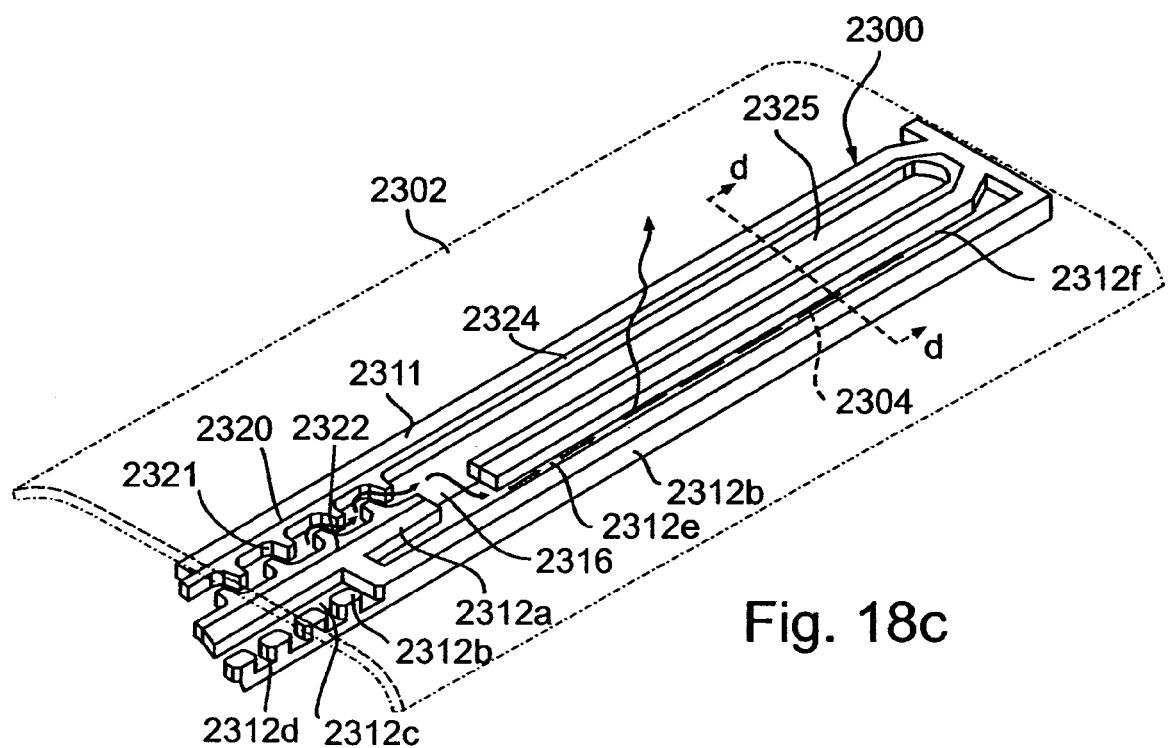
Figure 18D:
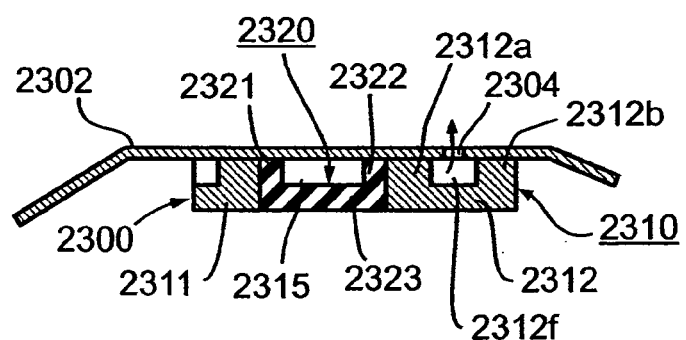
Figure 19:
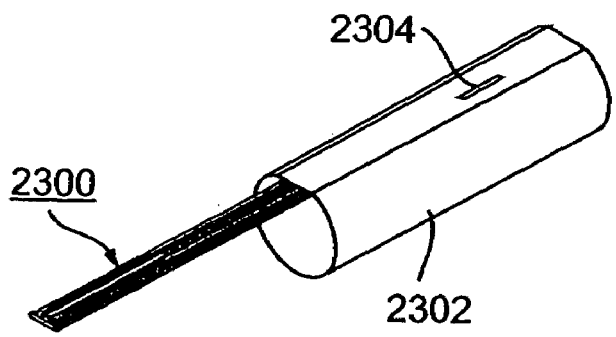
Figure 19A:
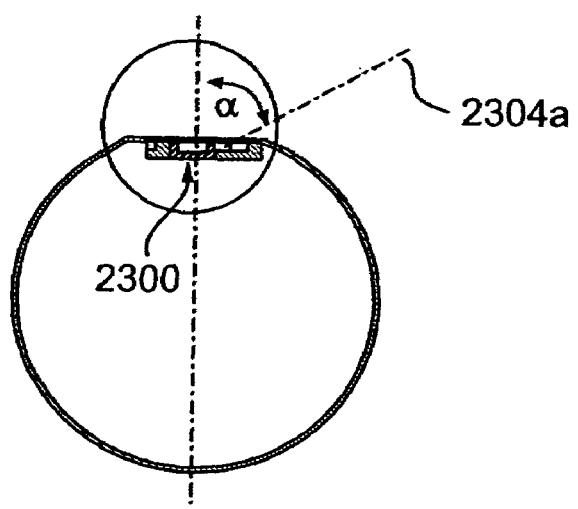
Figure 19B:
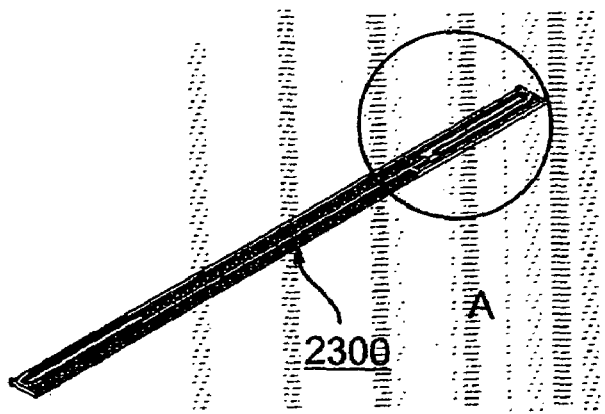
Figure 19C:
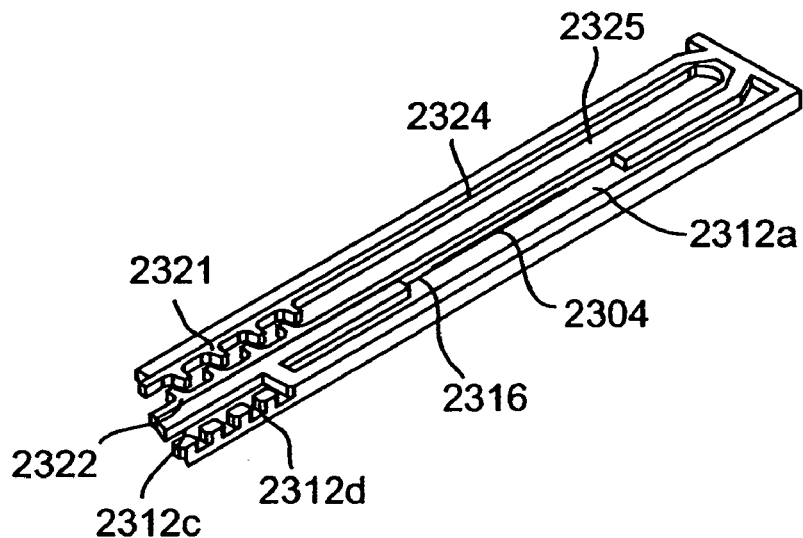
Figure 19D:
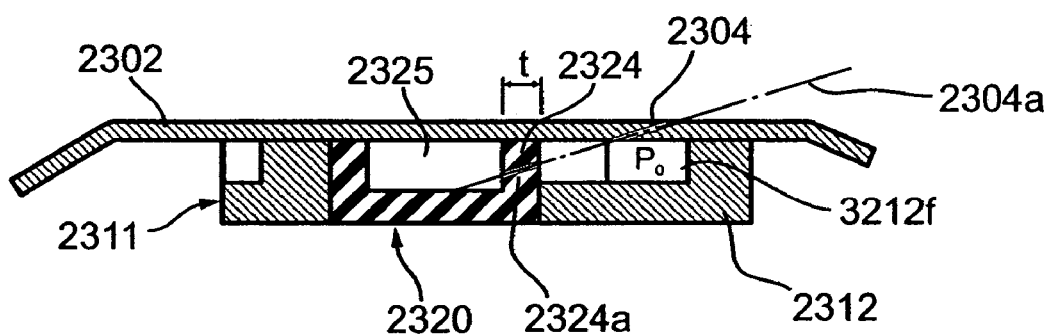
Figure 19E:
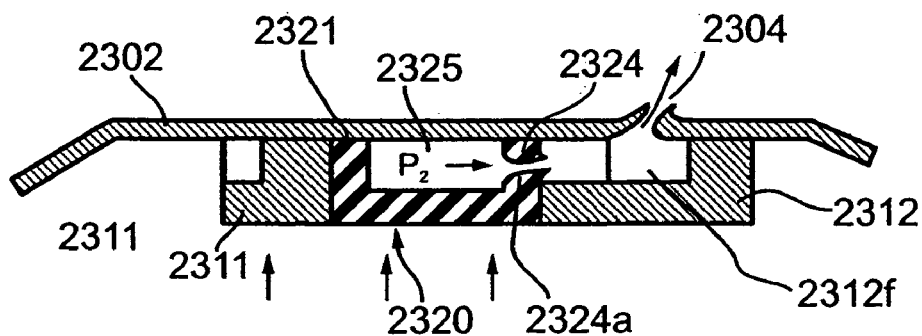
Figure 21:
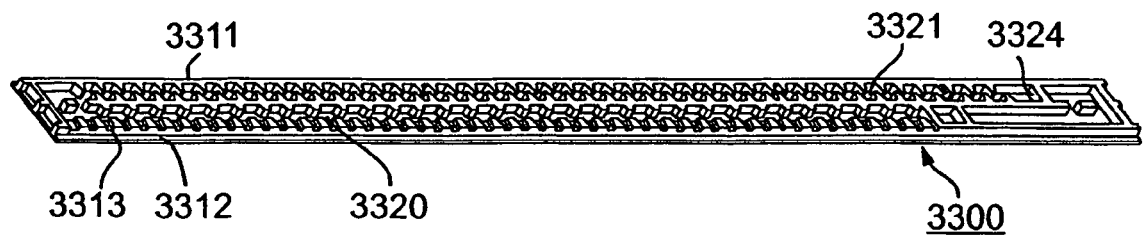
Figure 22:
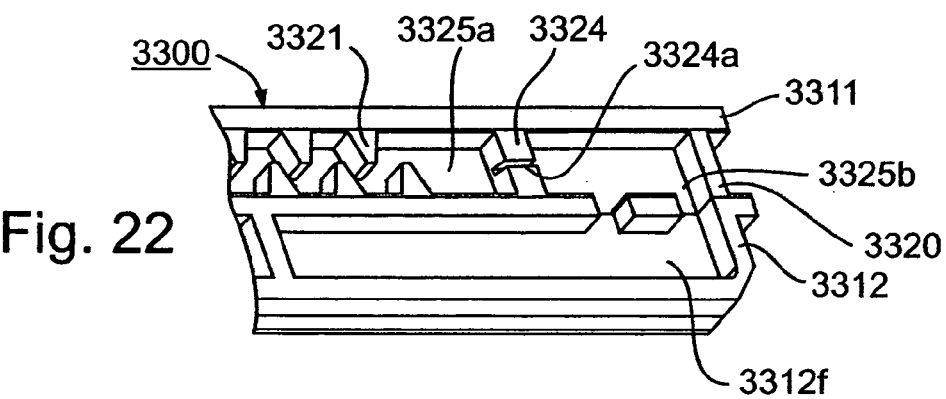
Figure 23:
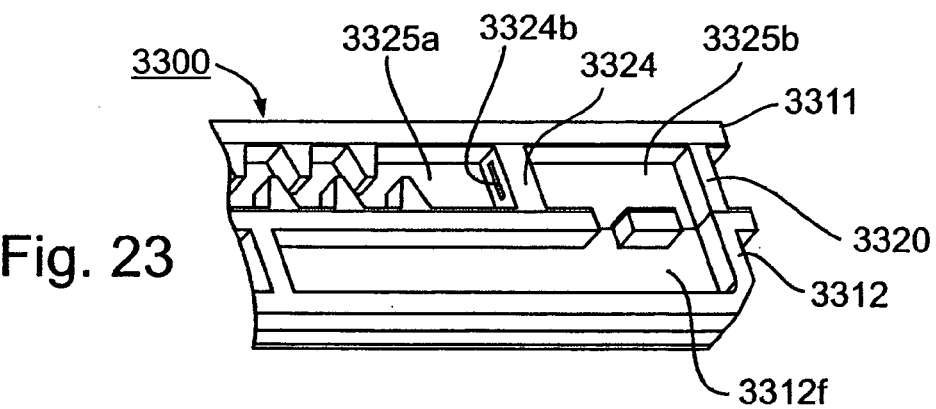
Figure 24:
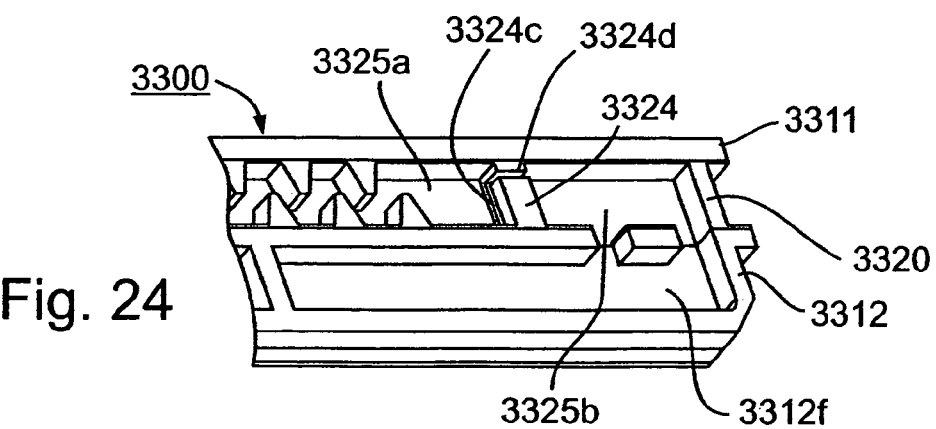
Figure 25:
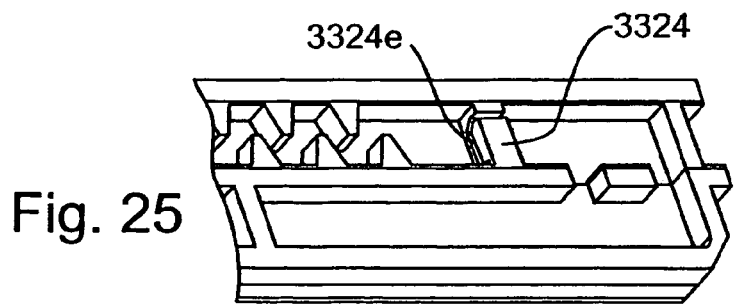
Figure 26:
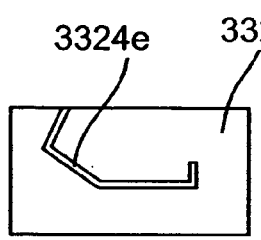
Figure 27:
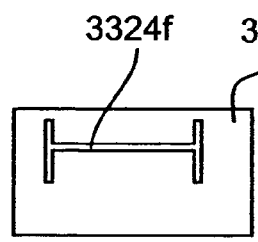
Figure 28:
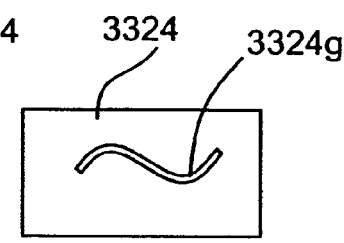
Figure 29:
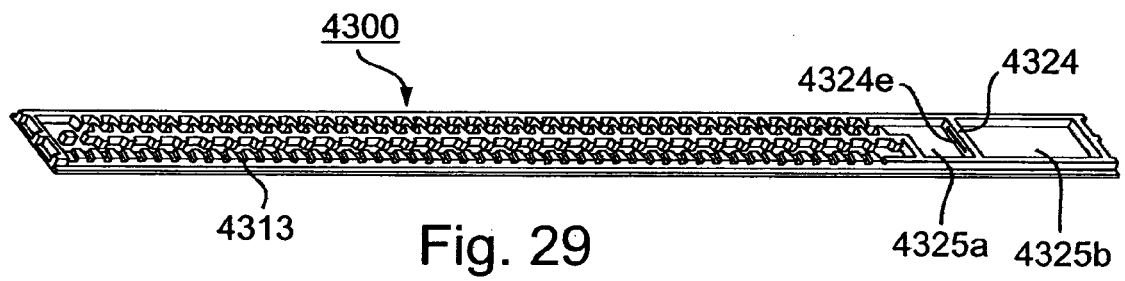
Figure 30:
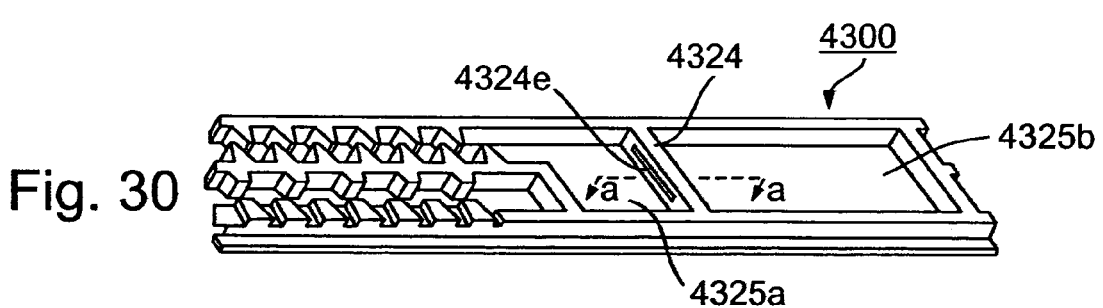
Figure 30A:
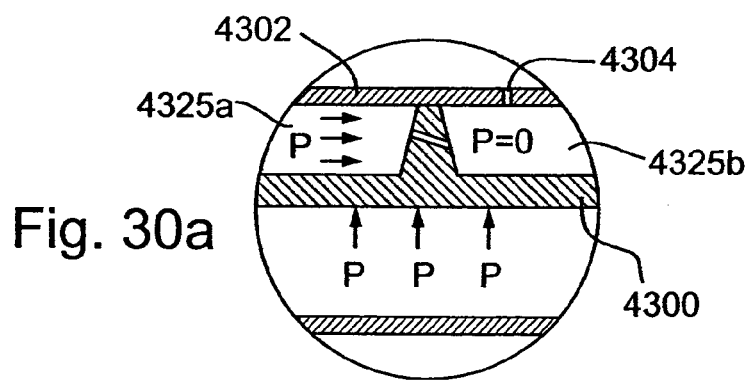
Figure 31:
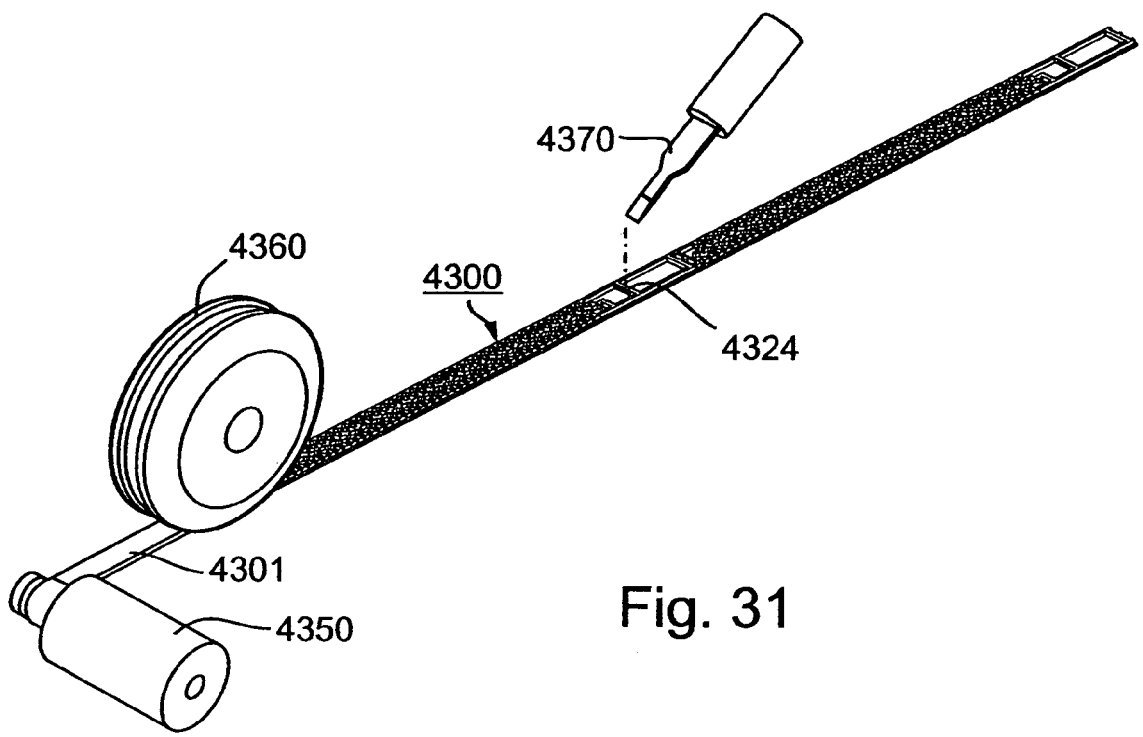
Figure 32:
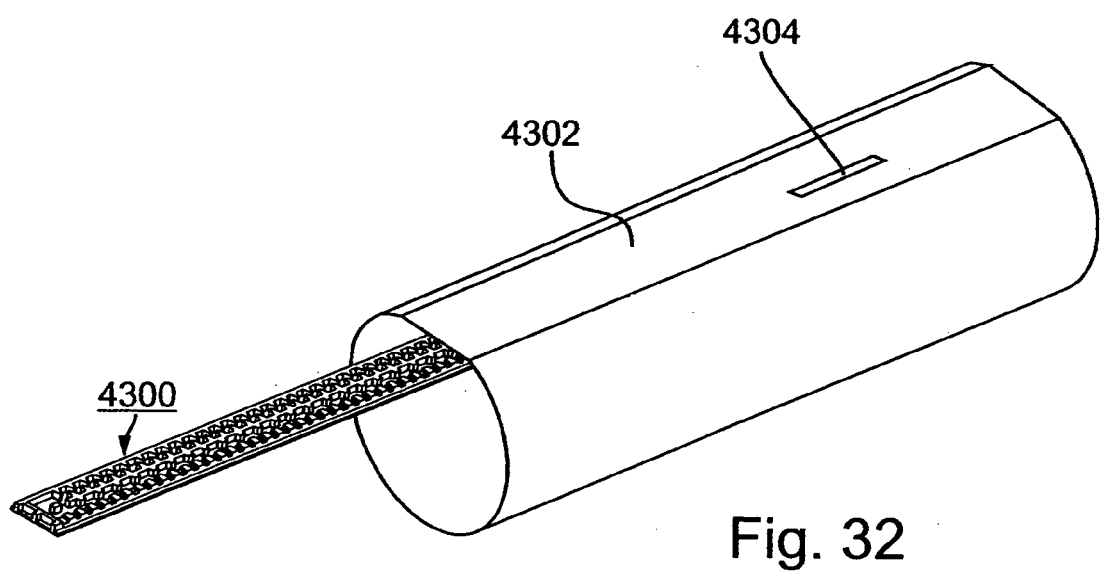
Figure 33:
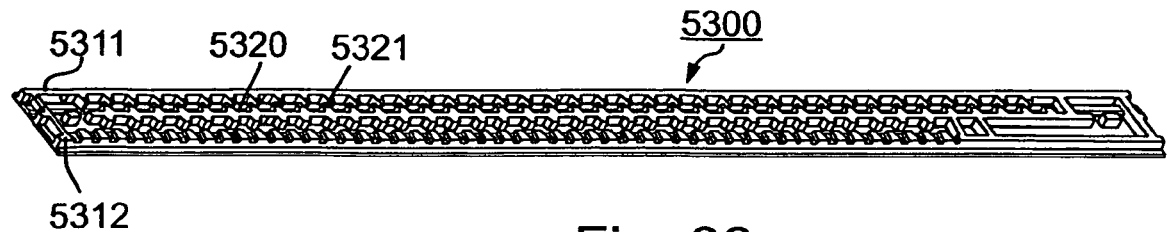
Figure 34:
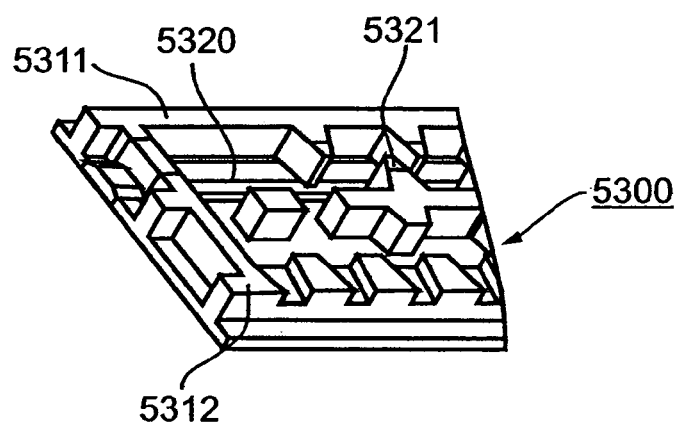
Figure 35:
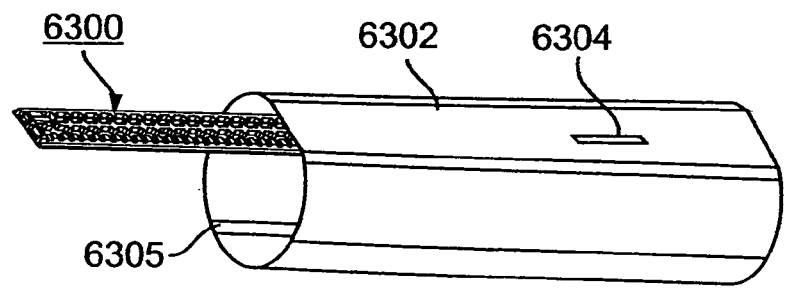

18b being an enlarged perspective view of a portion of FIG. 18, FIG. 18c being a greatly enlarged perspective view of the outlet end of the emitter element of FIG. 18b showing the outer tube and its outlet in broken lines, and FIG. 18d being a transverse sectional view of FIG. 18c along line d—d;

FIGS. 19, 19a, 19b, 19c and 19d are views corresponding to FIGS. 18, 18a, 18b, 18c and 18d, respectively, of another drip irrigation hose constructed in accordance with the invention, FIG. 19e being a view corresponding to FIG. 19d when the hose is pressurized;

FIGS. 20, 20a, 20b and 20c are views, corresponding to FIGS. 19, 19a, 19d and 19e, respectively, illustrating another drip irrigation hose constructed in accordance with the present invention;

FIG. 21 illustrates another construction of continuous strip in accordance with the present invention;

FIG. 22 is an enlarged fragmentary view illustrating the outlet end of one of the emitter elements in the continuous strip of FIG. 21;

FIGS. 23, 24 and 25 are fragmentary views illustrating modifications in the construction of the emitter strip at the outlet end of the emitter element;

FIG. 26 is an end view illustrating the shape of the slit in the rib of FIG. 25 at the outlet end of the respective emitter element;

FIGS. 27 and 28 are views similar to that of FIG. 26 but illustrating modifications in the shape of the slit formed in the rib;

FIG. 29 illustrates a continuous strip constructed in accordance with the present invention, similar to that of FIG. 21 but constituted of only relatively elastic material;

FIG. 30 is an enlarged fragmentary view of the outlet end of the strip of FIG. 29;

FIG. 30a is a sectional view along line a—a of the emitter strip of FIG. 30 when bonded to the inner face of the tube;

FIG. 31 illustrates one method of making the continuous strip defining emitter elements, and particularly for producing the slit in the rib at the outlet end of each emitter element;

FIG. 32 illustrates the emitter strip of FIG. 31 being applied to the inner face of a tube;

FIGS. 33 and 34 illustrate a further variation in the construction of the continuous strip defining the emitter elements; and FIG. 35 illustrates a drip irrigation hose constructed in accordance with the present invention but including a seamed tube, rather than a seamless, extruded tube.

It is to be understood that the foregoing drawings, and the description below, are provided primarily for purposes of facilitating understanding the conceptual aspects of the invention and various possible embodiments thereof, including what is presently considered to be preferred embodiments. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF PREFERRED EMBODIMENTS

As indicated earlier, FIGS. 1 and 2 illustrate a drip irrigation hose corresponding to the constructions illustrated in FIGS. 1 and 2 of the above-cited U.S. Pat. No. 6,371,390.

Briefly, the drip irrigation hose illustrated in FIGS. 1 and 2 comprises a sheet 2 of a thin, flexible plastic material having opposed outer edge portions 2a, 2b which are overlapped and bonded together to form a seam 3 extending longitudinally of the so-produced tube for conducting pressurized water therethrough. A plurality of emitter elements, each generally designated 4, are bonded to and between the overlapping portions 2a, 2b of the sheet 2 at longitudinally-spaced locations along the seam 3, and define a plurality of restricted flow passageways for discharging water from outlets 48 in the seamed hose at a slow rate.

The overlapping portions 2a, 2b of the flexible sheet are bonded together both by the emitter elements 4, and by a continuous, longitudinally-extending rib 5 extending along the outer edge of the outer overlapping portion 2a. The outer overlapping portion 2a is formed with an inwardly-extending slack 6 between the rib 5 and the emitter elements 4. The purpose of slack 6 is to cause the seamed hose, when pressurized by the water flowing through it, to tauten the hose wall, and thereby to apply a tangential force to the emitter elements 4 within the seam 3, such that, thereafter, the emitter elements will control the discharge through the hose outlets according to the pressure of the water within the hose. Such an arrangement decreases the sensitivity of the water discharge rates to changes in pressure of the water within the hose. The tangential force produces relative movement between the overlapping ends of the hose, thereby also tending to dislodge clogging particles within the emitter elements.

Each emitter element 4 includes a pair of spaced longitudinally-extending plastic strips 41, 42 closed at its opposite ends by converging transversely-extending strips 43, 44. Each emitter element further includes a plurality of teeth 45, 46 alternatingly projecting from one longitudinal strip towards the other longitudinal strip to define a labyrinth producing a turbulent flow passageway for the water through the emitter element. The water is inletted into the emitter element via inlet openings 47 (FIG. 1) in longitudinal strip 42 at the inlet end of the labyrinth defined by the teeth 45, 46, and is outletted from the emitter element via the outlet opening 48 in the plastic hose 2 at the outlet end of the respective labyrinth.

The continuous rib 5 at the outer edge of the seam 3 is made of a relatively inelastic material. The emitter elements 4, however, are made of a relatively elastic material which is softer, more pressure-deformable than the rib 5, and tends to return to its original shape when the pressure is removed. A preferred relatively inelastic material for the continuous rib 5 is polyethylene, and a preferred relatively elastic material for elements 41–47 of the emitter elements 4 is an elastomer, preferably one selected from the group consisting of EPDM (ethylene propylene rubber), NBR (nitrite rubber), TPE (Evoprene Thermoplastic Elastomer) compounds, particularly Evoprene G and Super G grades which bond well to polyethylene and propylene or a thermosetting elastomer prepared by cross-linking two liquids as described below with respect to FIGS. 6 and 7. A preferred material for making the plastic tube is polyethylene.

It will thus be seen that the plurality of emitter elements 4 are incorporated in the seam of the seamed plastic tube 2 and include a relatively elastic formation in the form of teeth 45, 46 of relatively elastic plastic material, and a relatively stiff formation in the form of rib 5 of relatively inelastic material, and that both formations are in direct contact with, and directly bonded to, the inner surface of the plastic material defining the tube 2. It will also be seen that the relatively elastic formation, namely the teeth 45, 46, is pressure-deformable and is located with respect to the relatively stiff formation, namely rib 5, such as to change the labyrinth of the respective emitter element in response to the pressure of the water in the tube at the location of the respective emitter element, and thereby to regulate the water discharge rate at the respective outlet 48.

Thus, when the hose is first filled with water, the water causes the hose to assume the circular shape illustrated in FIG. 2. In this initial, unpressurized condition of the hose, there is the slack 6 between the outer rib 5 and the emitter elements 4, as shown particularly in FIG. 2a; in this initial condition, there is no significant tangential or shear force applied to the emitter elements 4, and the height of the emitter elements 4 is and remains substantially the same as the height of the rib 5.

As the hose 2 is filled with pressurized water, the pressure tends to increase the diameter of the hose 2. Since the rib 5 is firmly bonded between the overlapping sheet portions 2a, 2b of the seam 3 at the outer edge of the overlying portion 2a, and since the rib 5 is relatively stiff, whereas the emitter elements 4 constituting the relatively elastic formation are pressure-deformable, the increase in pressure within the hose 2 tautens the slack 6, and at the same time tends to move hose edges 2a, 2b in opposite directions, thereby applying a tangential or shear force to the emitter elements. Since these elements are of a relatively elastic or deformable material, this tangential force changes the shape of the turbulent flow passageways defined by them to change the resistance to flow. Thus, an increase in the pressure within the hose will compress the relatively elastic elements, to thereby reduce the cross-sectional area of the flow path, whereas a decrease in the hose pressure will permit the relative elastic elements to return to their original shapes.

As more particularly described in the above-cited U.S. Pat. No. 6,371,390, the pressure-compensation in this construction is effected by two forces, namely: the tangential force tending to change the shape of the turbulent flow passageway; and the compressional force tending to reduce the cross-sectional area of the flow path. The above two forces actually act in parallel; however, the tangential force is predominant in the lower pressure ranges until the slack 6 is taken-up, whereupon the compressional force becomes predominant in the higher pressure ranges.

Figure 3:
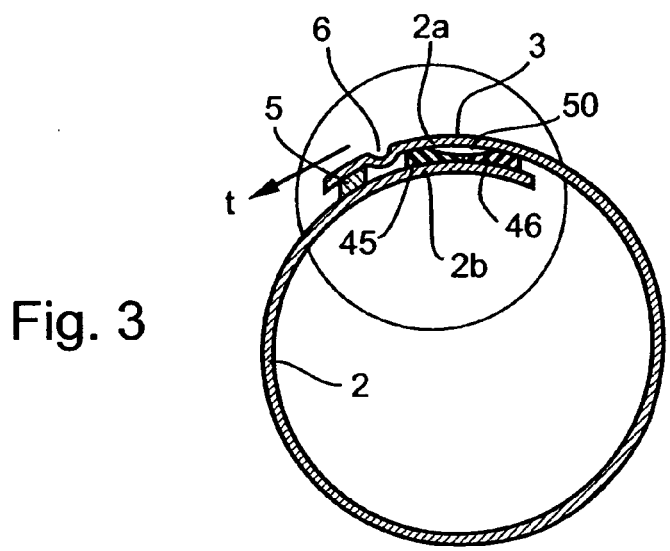
FIG. 3 is a sectional view illustrating a modification in the drip irrigation hose of FIGS. 1 and 2, wherein the hose is formed with a clearance serving as a bypass of the labyrinth in each emitter element in the non-pressurized condition of the hose.
Figure 3A:
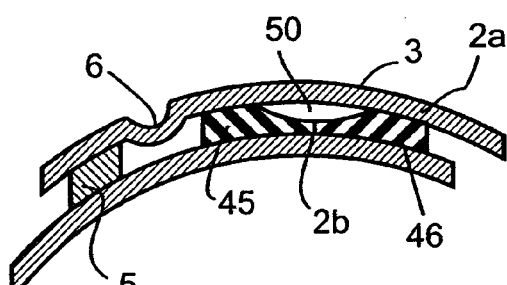
Figure 3B:
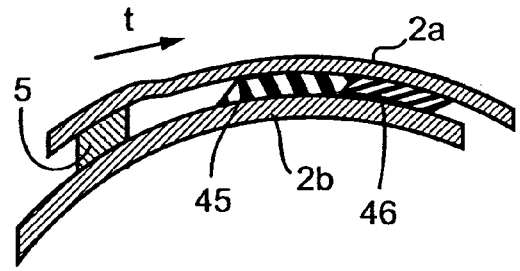
FIG. 3*b* is a corresponding view showing the closing or disappearance of the clearance in the pressurized condition of the hose.

FIGS. 3, 3a and 3b illustrate a drip irrigation hose similar to that of FIGS. 1 and 2 of U.S. Pat. No. 6,371,390 as described above, and therefore to facilitate understanding, the corresponding parts are identified by the same reference numerals.

One important difference in the construction of the drip irrigation hose illustrated in FIG. 3 is the provision of a bypass clearance, shown at 50 in FIGS. 3 and 3a, between the inner face of the plastic tube 2 and the tips of the teeth 45, 46 of relatively elastic material defining the labyrinths. As shown in FIG. 3a, the tips of all the teeth 45, 46 are reduced in height so as to produce, in the non-pressurized condition of the hose, the clearance 50 which bypasses all the labyrinths such that a laminar flow will be produced through clearance 50 bypassing all the labyrinths. However, as shown in FIG. 3b, when the hose is pressurized, clearance 50 is closed by the deformation of the teeth, thereby removing the laminar bypass flowpath for the respective labyrinth via clearance 50, and forcing the water to flow through the turbulent flowpath of the respective labyrinth defined by teeth 45, 46. It will be appreciated that after the laminar bypass flowpath has been removed, regulation thereafter in response to pressure will be effected by changing the configuration of the turbulent flowpath of the respective labyrinth.

Figure 4A:
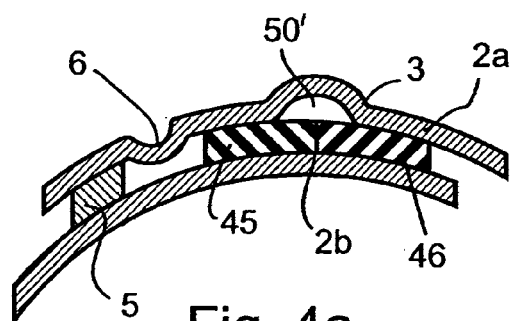
FIGS. 4*a* and 4*b* are views corresponding to those of FIGS. 3*a* and 3*b*, respectively, but illustrating another arrangement for producing the bypass clearance in the non-pressurized condition of the hose.
Figure 4B:
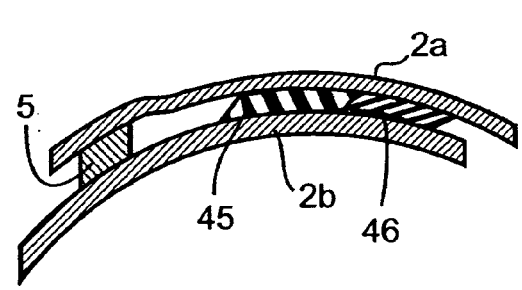

FIGS. 4a and 4b are views corresponding to FIGS. 3a and 3b but illustrating a modification in the construction of the hose to produce similar results. Thus, as shown in FIG. 4a, the clearance 50', corresponding to clearance 50 in FIG. 3, is produced in the non-pressurized condition of the hose by providing a longitudinally-extending slack in the outer tube 2, rather than by decreasing the height of the tips of the teeth 45, 46 as in FIG. 3. As shown in FIG. 4b, when the hose is pressurized, outer tube 2 is tautened such that clearance 50' of FIG. 4a is closed, thereby also removing the laminar-flow bypass of the labyrinth defined by the teeth 45, 46, in the same manner as described above with respect to FIG. 3.

Figure 5:
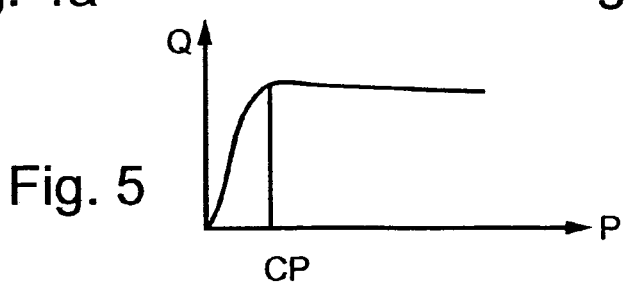
FIG. 5 is a curve illustrating the pressure/flow-rate relationship shown in FIG. 3 of U.S. Pat. No. 6,371,390, but applied to the latter modifications including a bypass clearance.

The constructions of FIGS. 3 and 4 also produce an initial rapid build-up in the flow through the outer tube 2 with an increase in pressure, and thereafter a relatively uniform flow with an increase in pressure, as described with respect to FIG. 3 in the above-cited U.S. Pat. No. 6,371,390. This is schematically shown in FIG. 5, wherein "CP" represents the pressure at which the clearance (50 or 50') closes. In such a construction, the slack 6 (FIG. 3a, 3b) can be retained or omitted.

Figure 6:
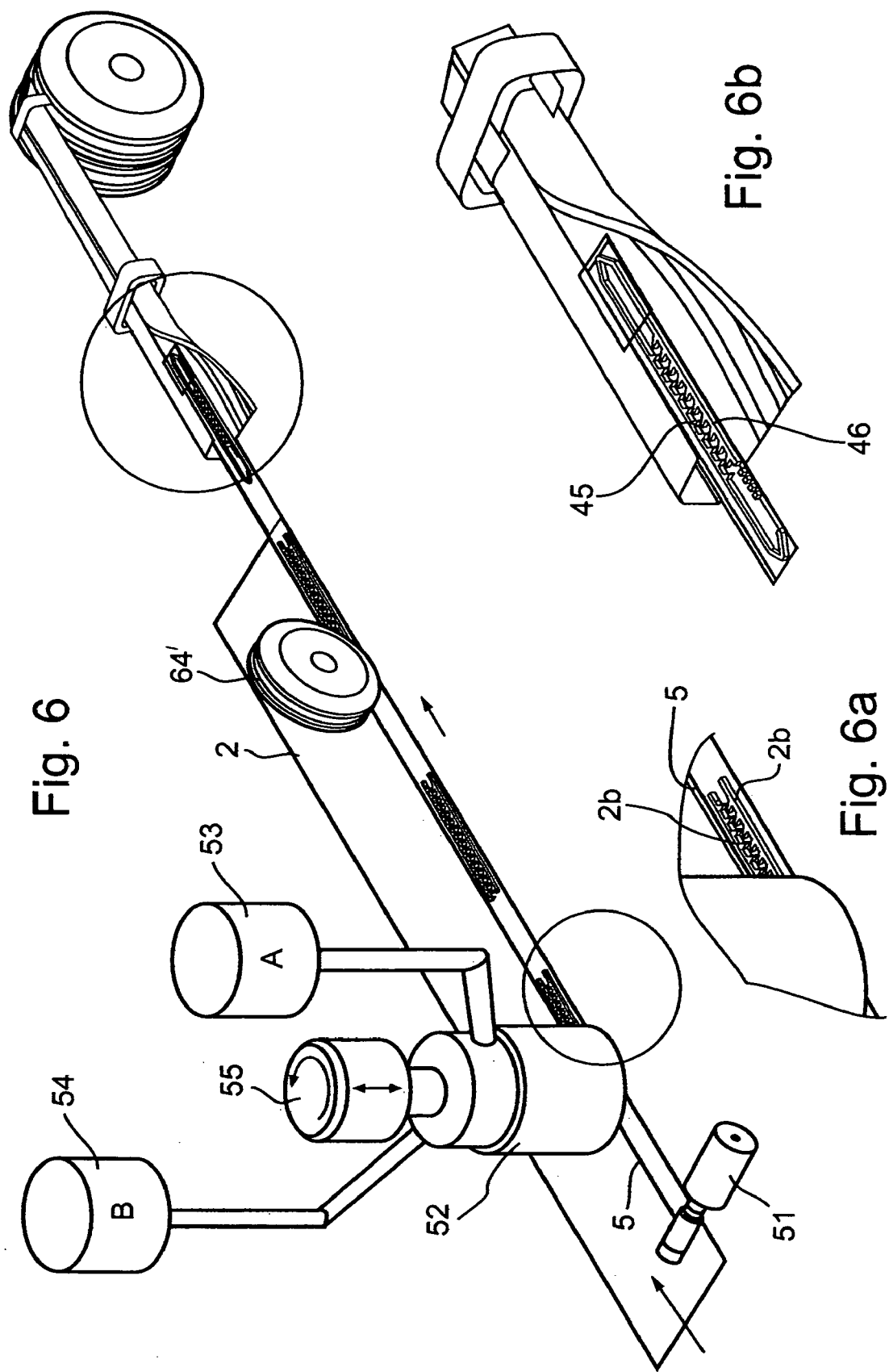
FIG. 6 illustrates apparatus corresponding to that shown in FIG. 5 of U.S. Pat. No. 6,371,390, but wherein the relatively elastic material is produced by cross-linking two liquids.

FIGS. 6, 6a and 6b generally correspond to FIGS. 5, 5a and 5b of the above-cited U.S. Pat. No. 6,371,390 for making the drip irrigation hose but illustrate a modification in the method of making such a hose. In this modification, the continuous rib 5 may be of the relatively inelastic material, such as polyethylene, extruded by extruder 51. However, the relatively elastic material of the emitter elements is of a thermosetting elastomer, preferably a silicone rubber, made of two materials, each originally in a liquid state, but capable of being cured into a solid state by cross-linking when mixed together in a heater-mixer. The cross-linking curing process produces a relatively elastic solid material which is thermosetting in nature. Such thermosetting material may not bond well to the polyethylene of the plastic tube in the produced drip irrigation hose, and therefore an adhesive coating may be applied to enhance the bonding, as described below with reference to FIGS. 14–17b.

The known cross-linking curing process depends on time and temperature. For example, the curing can be effected in 30 seconds at 230° C., or in 2 minutes at 150° C. In the process of FIG. 6, the conditions of time and temperature in the heater-mixer are such that only a part of the curing takes place in the heater-mixer itself. The remainder of the curing takes place later, after the intermittently formed strips exit from the heater-mixer.

Thus, as shown in FIG. 6, the two materials (A, B) producing the relatively elastic material formation is supplied to a heater-mixer 52 from two liquid sources 53, 54. The two liquids are mixed and heated to a temperature preferably lower than the normal recommended curing temperature. The cross-linking begins in the heater-mixer 52. The partially-crosslinked product is forced out by a piston 55 intermittently onto the moving surface of the polyethylene strip 2 to define the composite strip. The composite strip is embossed by the embossing wheel 64 to produce the teeth 45, 46 of the emitter elements. The so-produced composite strip thus includes the relatively elastic formation of the teeth 45, 46 defining turbulent flow passageways which regulate the flow in response to pressure, and the relative inelastic rib 5 laterally of the teeth.

One example of the two liquids that can be used for making the relatively elastic emitter elements is "Elastosil"

(Reg. TM) LR 3153 A, B, supplied by Wacker Silicone. These liquid materials, when mixed and cured by cross-linking, produce a solvent-free, thermosetting, silicone rubber particularly useful for coating textile-braided cables. While the mixture is normally cured (cross-linked) by a high temperature applied for a short time, in the present case it is, preferably, only partially cured by the heat in the heater-mixer 52, the curing being completed subsequently over a period of time. The embossing wheel 64 may also be heated to enhance the cross-linking. In this construction, it is not necessary that the teeth of the silicone rubber be firmly welded to the plastic tube.

Figure 7:
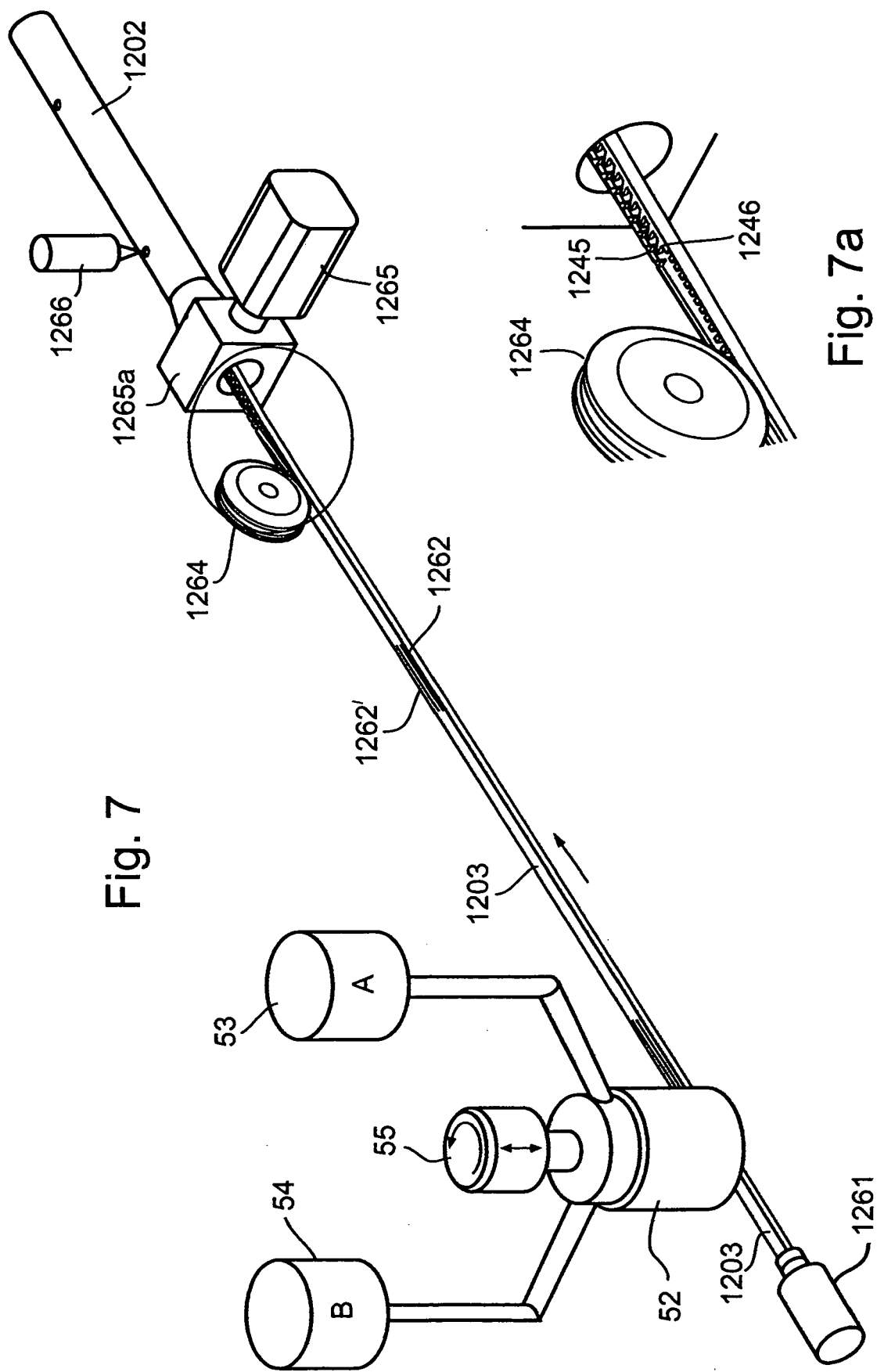
FIG. 7 illustrates apparatus similar to that of FIG. 22 of U.S. Pat. No. 6,371,390, but modified to produce the relatively elastic material by cross-linking two liquids.

FIG. 7 illustrates a similar process for producing a drip irrigation hose in which the outer tube 1202 is of the seamless type, as illustrated described for example in FIG. 22 of the above-cited U.S. Pat. No. 6,371,390. To facilitate understanding, the same reference numerals are used, except that here the relatively elastic material is of the cross-linked silicon rubber, as described above with respect to FIG. 6. This material is applied to the strip 1203 of inelastic material (e.g., polyethylene), exiting from its extruder 1261, by the heater-mixer 52 supplied with the two liquids A, B from the two sources 53, 54. The relatively elastic material formation applied by the heater mixer 52 is embossed by embossing wheel 1264 to form the teeth 1245, 1246 of the labyrinths (FIG. 7*a*). The so-formed composite strip then passes through the cross-head 1265*a* of extruder 1265 which extrudes the tube 1202 around the strip. In this case, the extrusion process also heats the silicone rubber and aids in the cross-linking thereof.

Figure 8:
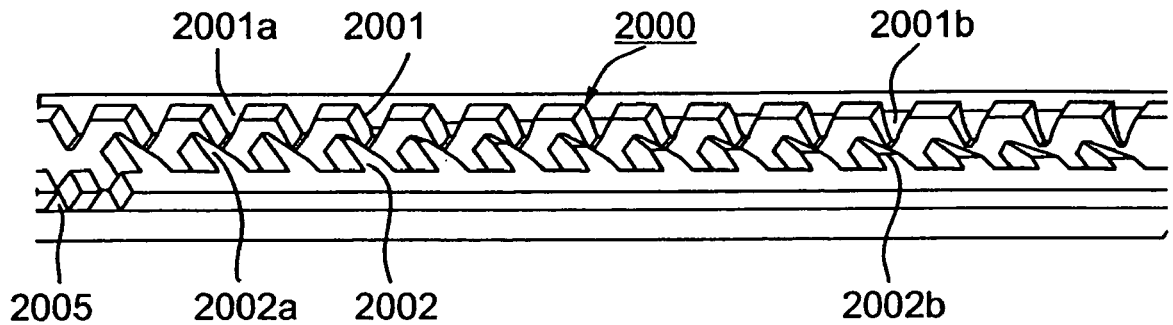
FIGS. 8 and 9 illustrate an emitter element in which the labyrinth includes sequentially-closing clearances from one end of the labyrinth to the other end to provide pressure-compensation in accordance with the description in my U.S. Pat. No. 5,400,973.
Figure 9:
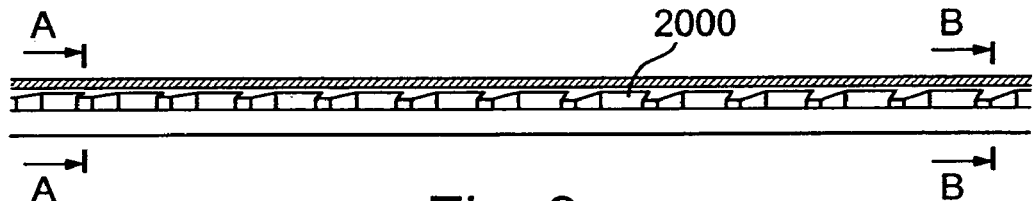

FIGS. 8 and 9 illustrate a modification in the construction of each of the labyrinths, therein designated 2000, in order to produce sequentially-closing clearances, or a progressively-closing clearance, in accordance with constructions described in my U.S. Pat. No. 5,400,973. Thus, as shown in FIGS. 8 and 9, the two rows of the teeth 2001, 2002, define a turbulent flow passageway between them, including teeth 2001*a*, 2002*a* at one end having tips of fixed height, and teeth 2001*b*, 2002*b* at the opposite end having tips of progressively decreasing height and/or width.

Teeth 2001*a*, 2002*a*, at one end of each emitter element thus define a fixed pressure-dropping labyrinth devoid of a bypass clearance, to produce a fixed resistance to the water flow during both the unpressurized condition and pressurized condition of the hose.

On the other hand, teeth 2001*b*, 2002*b* define a regulating labyrinth having a clearance which progressively changes in height from one end of the labyrinth to the opposite end, thereby effectively producing a series of sequentially-closing clearances which progressively close with an increase in pressure at the respective labyrinth. Thus, in the initial, unpressurized condition of the hose, these clearances substantially bypass the regulating labyrinths to render each ineffective to restrict the flow; but as water pressure increases, these clearances are sequentially closed to render each regulating labyrinth effective to regulate the flow therethrough in response to the water pressure, as described in the above-cited U.S. Pat. No. 5,400,973.

Figure 9A:
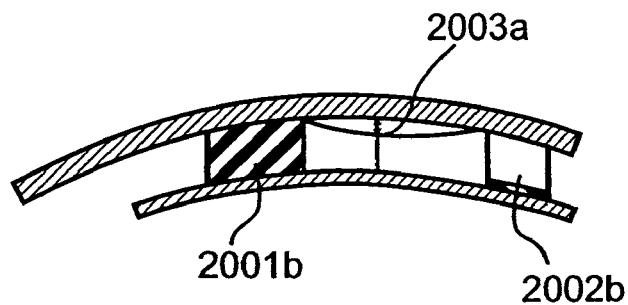
FIGS. 9*a* and 9*b* illustrate the clearances along lines A—A and B—B of FIG. 9 at the opposite ends of the labyrinth in the non-pressurized condition of the drip irrigation hose.
Figure 9B:
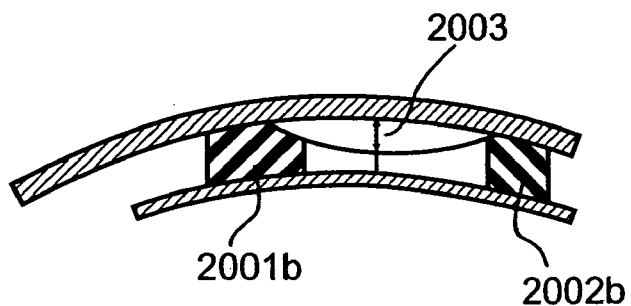

FIG. 9*a* illustrates the clearance 2003*a* at one end of a regulating labyrinth defined by teeth 2001*b*, 2002*b*; and FIG. 9*b* illustrates the larger clearance 2003*b* at the opposite end of the labyrinth defined by these teeth.

It will be appreciated that, where this feature is included in the drip irrigation hoses, other techniques for producing sequential-closing clearances could also be used in the regulating labyrinths. In the illustrated construction, the upstream portion of at least the strip of relatively elastic material defining the teeth 2002*a* of the fixed labyrinth is formed with slots 2005 (FIG. 8) to serve as inlets into the respective labyrinths.

Figure 10:
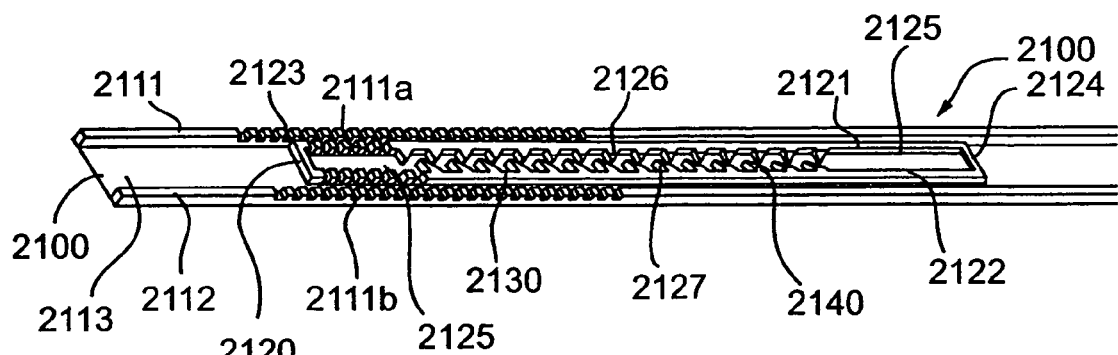
FIG. 10 is a three-dimensional view illustrating a modification in the construction of the emitter strip to be included in the drip irrigation hose.
Figure 11:
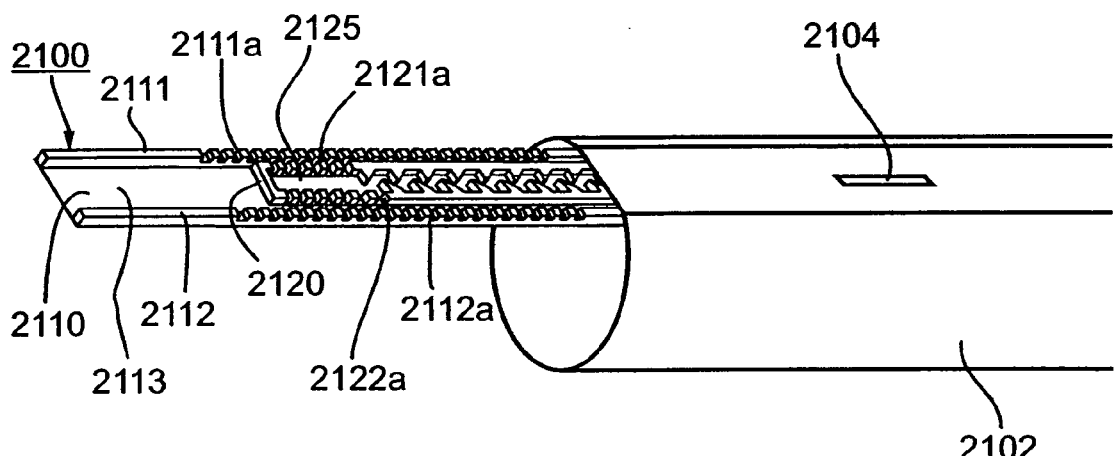
FIG. 11 illustrates the emitter strip of FIG. 10 as applied to the inner surface of the outer tube for producing the drip irrigation hose.
Figure 11A:
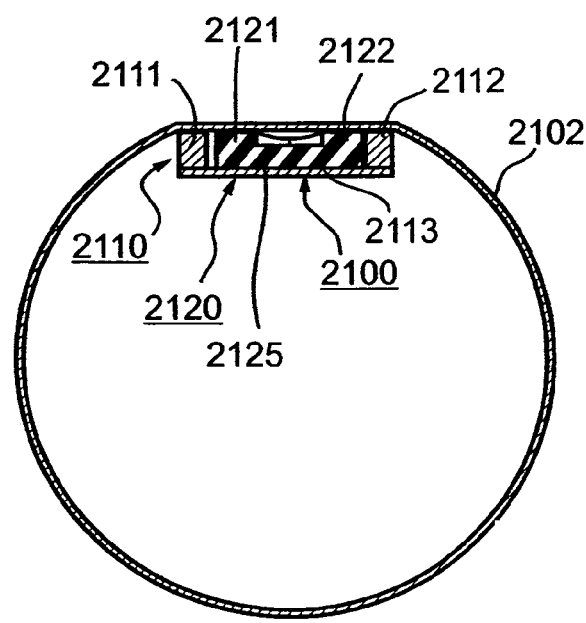
FIG. 11*a* is a transverse section of the drip irrigation hose of FIG. 11.

FIGS. 10 and 11 illustrate another construction of emitter unit, generally designated 2100, for application to the inner surface of an outer plastic tube 2102 formed with outlets 2104 for discharging the water after traversing the respective labyrinth. Emitter element 2100 is in the form of a continuous composite strip constituted of a continuous strip 2110 of the relatively inelastic material, such as polyethylene; and a plurality of longitudinally-spaced strips 2120, each made of the relatively elastic material, such as elastomer, and defining the labyrinth to the respective outlet 2104.

Continuous strip 2110 of the relatively inelastic material is formed with a pair of spaced ribs 2111, 2112, along its opposite sides, joined together by a thin flexible web 2113. Each of the emitter element strips 2120 is of the relatively elastic material and is applied to web 2113 of the continuous strip 2110 between, and slightly spaced from, the two ribs 2111 and 2112. The two ribs 2111 and 2112 thus straddle, and are spaced from, the emitter elements 2120.

Each emitter element 2120 is of an open rectangular shape. Each is formed with a pair of opposed longitudinally-extending strips 2121, 2122 joined at the opposite ends by transversely-extending strips 2123, 2124, and all joined together by an underlayer 2125. The longitudinally-extending strips 2121, 2122 are shaped (e.g., by embossing wheel 1264, FIG. 7) into two groups of teeth 2126, 2127 integrally formed with the underlayer 2125, all of the relatively elastic material.

In the construction illustrated in FIG. 10, the two groups of teeth 2126, 2127 in each emitter unit 2120 also define two labyrinths, namely: (1) labyrinth 2130, in which the teeth are of fixed height to produce a fixed pressure drop in the water flowing therethrough; and (2) labyrinth 2140 in which the teeth are of varying height to define sequentially-closing clearances producing a self-regulated pressure drop in the water flowing through that labyrinth, as described above with respect to FIGS. 8 and 9, and in the above-cited U.S. Pat. No. 5,400,973. The fixed-height teeth labyrinth 2130 is on the inlet, upstream end of each emitter unit 2120. It communicates with the water within the tube 2102 through slots 2111*a*, 2112*a*, formed in the ribs 2111 and 2112 of the relatively inelastic material, and through slots 2121*a* and 2122*a* formed in the strips 2121, 2122, of the relatively elastic material. As described above with respect to FIGS. 8 and 9, a bypass clearance is provided, in the non-pressurized condition of the tube, only with respect to the teeth in the regulating labyrinth 2140, and not with respect to the teeth in the fixed pressure-drop labyrinth 2130.

Figure 12:
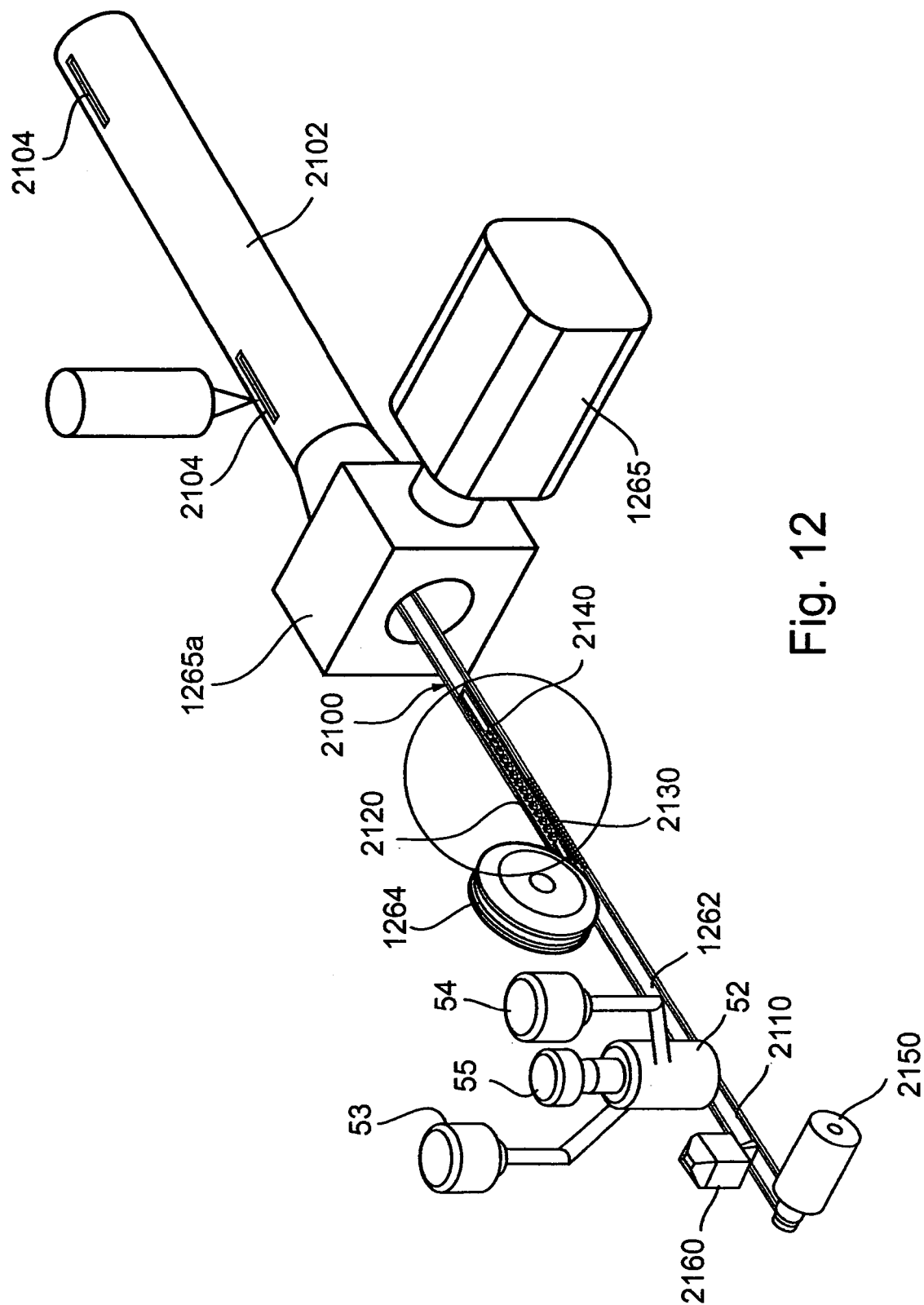
FIG. 12 illustrates apparatus, similar to that of FIG. 7 for making the drip irrigation hose of FIG. 11 including the emitter strip of FIG. 10.

When the emitter unit 2100 illustrated in FIG. 10 is applied to the tube 2102, it is bonded to the inner surface of the tube at the outer surfaces of the ribs 2111, 2112 of strip 2110 of relatively inelastic thermoplastic material (e.g., polyethylene). The emitter units 2120, particularly when using the thermosetting elastomer material described above which does not bond well to a thermoplastic surface, preferably are not actually bonded to the inner surface of the tube 2102. FIG. 12 illustrates apparatus similar to that of FIG. 7 for producing the drip irrigation hose illustrated in FIG. 11. To facilitate understanding, those parts which are substantially the same as those illustrated in FIG. 7 are identified by the same reference numerals.

Thus, as shown in FIG. 12, the strip 2110 of the relatively inelastic material is extruded via an extruder 2150 and is subjected first to a corona discharger 2160 before the relatively elastic material is applied by the heater/mixer 52 supplied from the two liquid sources 53, 54. As described earlier, the two materials are mixed and heated to a temperature lower than the normal curing temperature in the heater mixture 52 so as to begin the cross-linking; and the partially cross-linked product is forced out by piston 55 from the mixture intermittently onto the moving surface of the continuous strip 2110. The partially cross-linked formation 1262 is embossed by the embossing wheel 1264 to produce the emitter elements 2120, each including a fixed-height labyrinth 2130, and a varying-height labyrinth 2140, before entering the cross-head 1265a wherein the outer tube 2102 is extruded over the composite emitter strip 2100 by the extruder 1265.

Figure 13:
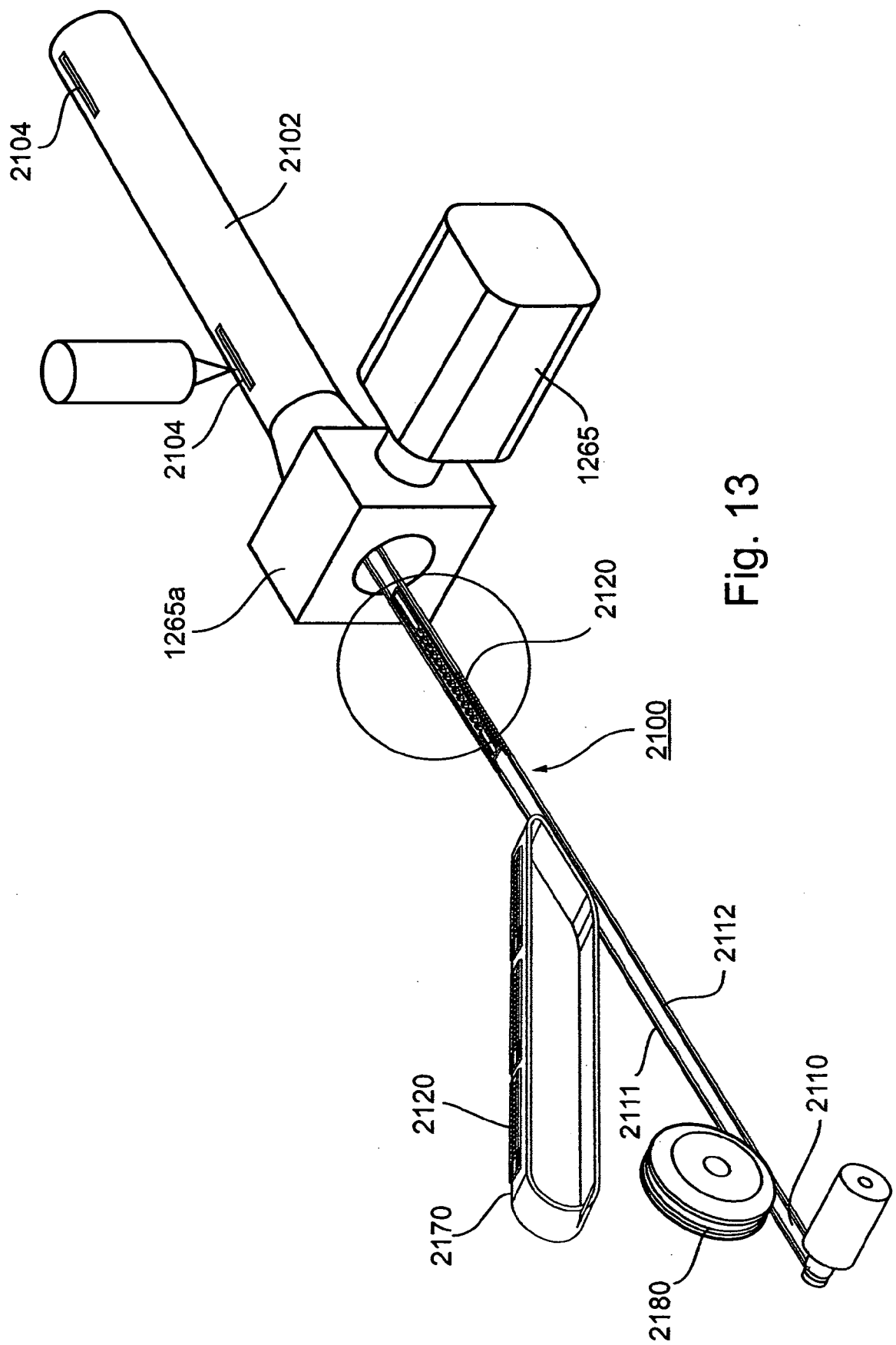
FIG. 13 illustrates apparatus similar to that of FIG. 5*c* of U.S. Pat. No. 6,371,390, for making the drip irrigation hose illustrated in FIG. 11.

FIG. 13 illustrates other apparatus for producing the drip irrigation hose of FIG. 11. Thus, as shown in FIG. 13, the preformed elastic emitter elements 2120 are fed by conveyor 2170 onto the continuous strip 2110 of relatively inelastic material before the composite strip 2100 enters the extruder cross-head 1265a for extruding the outer tube 2102. Feeder 2170 is operated at a lower linear velocity than that of the continuous strip 2110 so that the relatively elastic emitter elements 2120 will be spaced longitudinally along the resulting composite strip 2100.

Since the apparatus illustrated in FIG. 13 does not include an embossing wheel corresponding to embossing wheel 1264 in FIG. 12 for forming the labyrinth in the relatively elastic element 2120, another embossing wheel 2180 is provided, upstream of conveyor 2170, to emboss the ribs 2111, 2112 of the continuous strip 2110 with the slits (2111a, 2112a, FIGS. 10, 11) to define the inlets into the emitter elements 2120.

Figure 14:
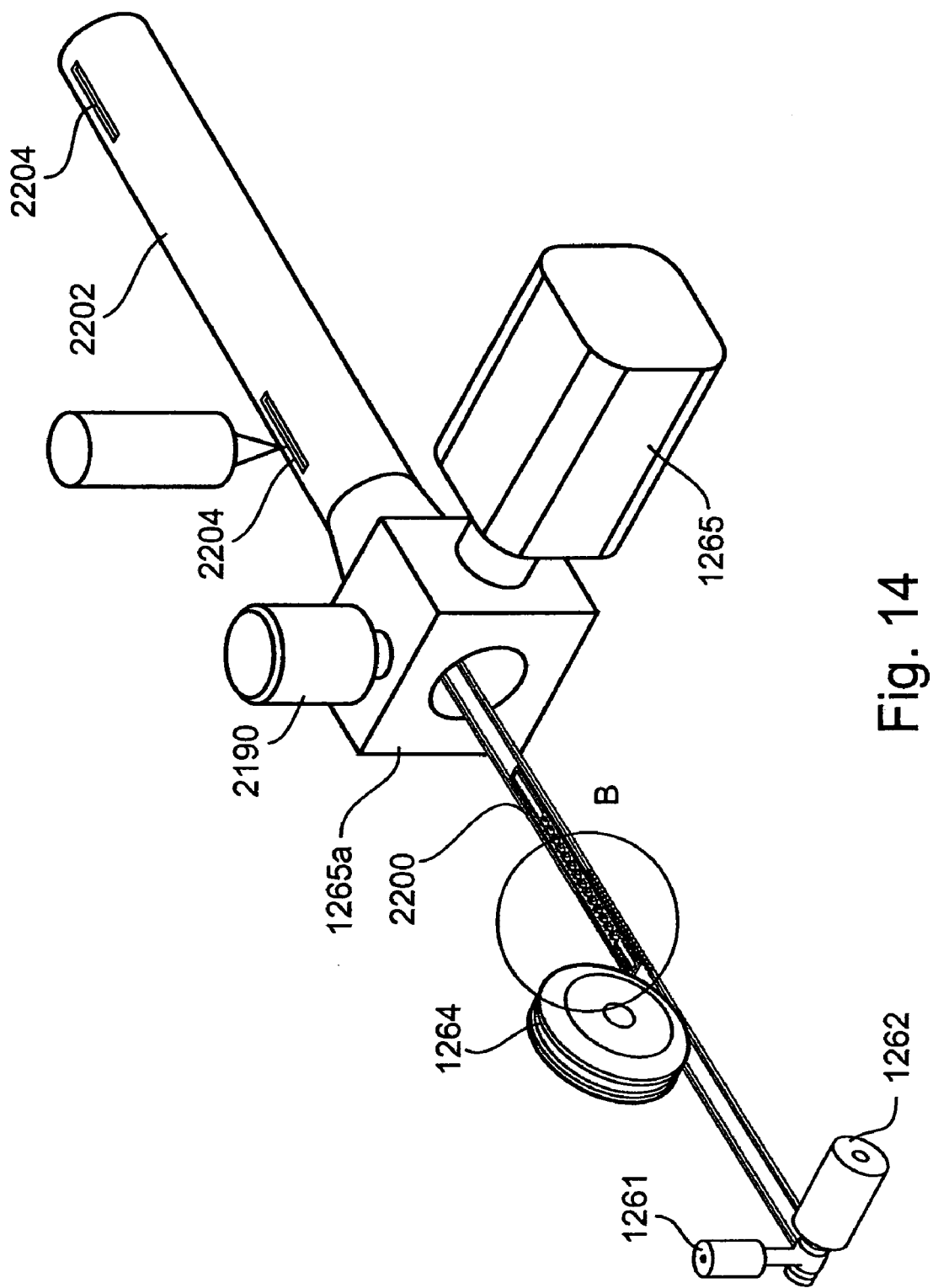
FIG. 14 illustrates a modification in the apparatus of FIG. 22 of U.S. Pat. No. 6,371,390, for applying an adhesive/strengthening coating to the inner surface of the outer tube before bonding same to the drip irrigation emitter strip.

FIG. 14 illustrates apparatus similar to that of FIG. 22 of U.S. Pat. No. 6,371,390, but including a coating applicator 2190 for applying a coating, shown at 2203 in FIG. 16, of an adhesive material on the inner face of the extruded tube, shown at 2202, or on the outer face of the composite strip, shown at 2200, as the composite strip travels from the embossing wheel 1264 into the cross-head 1265a of the outer tube extruder 1265. Coating 2203 promotes the adhesion of the emitter strip to the inner surface of the excluded outer tube 2202 and also strengthens the outer tube 2202 at the outlet openings 2204. A material found particularly suitable for this purpose is one sold under the Trademark "POLYGLUE" supplied by SK Corporation. This material is an adhesive resin consisting of a modified polyolefin with functional groups to bond firmly to common polyolefins, polyamides, ethylene vinyl alcohol (EVOH), as well as wood and metals.

The apparatus illustrated in FIG. 14 is otherwise the same as described above with respect to FIG. 22 of U.S. Pat. No. 6,371,390.

Figure 15:
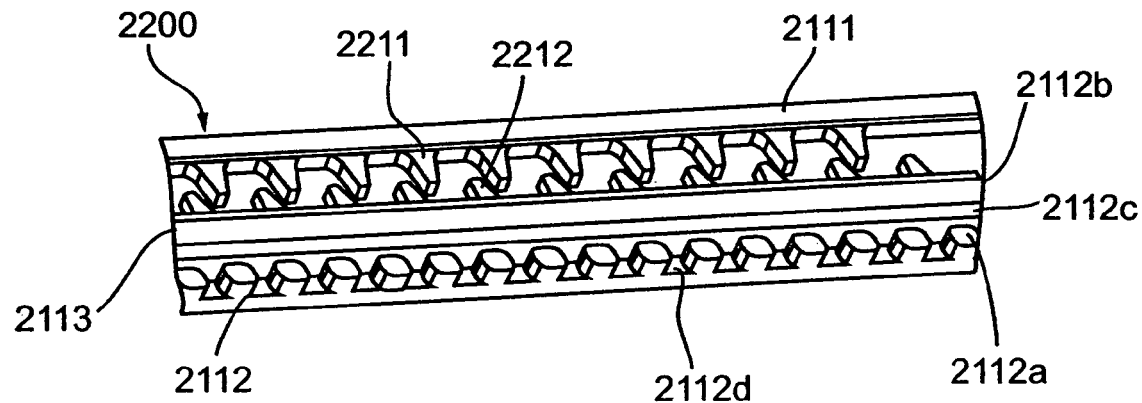
FIG. 15 is a fragmentary three-dimensional view illustrating the drip irrigation hose produced by the apparatus of FIG. 14.
Figure 16:
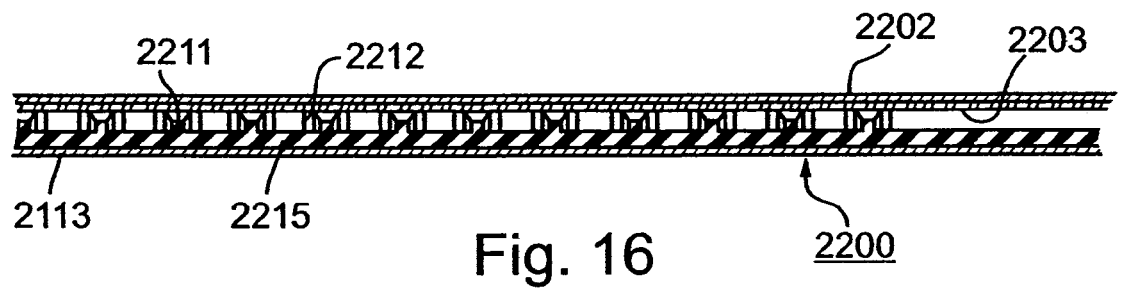
FIG. 16 is a longitudinal sectional view of the drip irrigation hose of FIG. 15.
Figure 16A:
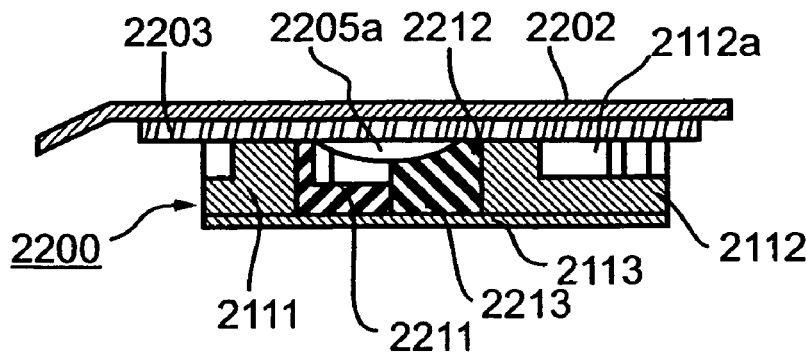
FIGS. 16*a* and 16*b* are enlarged transverse sectional views of the drip irrigation hose of FIG. 16 at the opposite ends of a labyrinth.
Figure 16B:
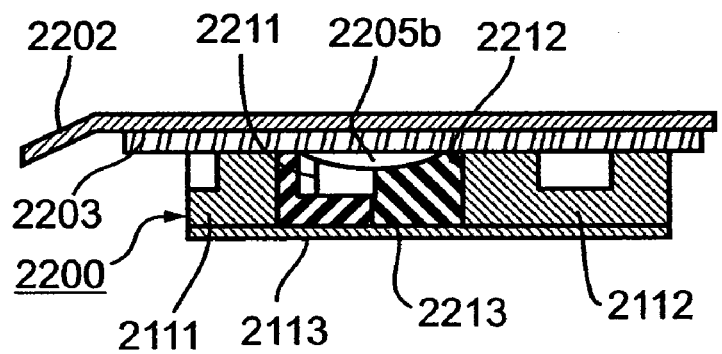

FIGS. 15 and 16 illustrate a fragment of a regulating labyrinth in each emitter element 2200 of the drip irrigation hose producing by the apparatus of FIG. 14; whereas FIGS. 16a and 16b are enlarged fragmentary views of FIG. 16 illustrating the structure of each emitter element 2200 at the opposite ends of the respective labyrinth. Thus, as shown, the emitter element 2200 is bonded to the inner surface of the outer tube 2202 by the adhesive layer 2203 applied by the applicator 2190 (FIG. 14). The emitter element 2200 may be of any of the above-described constructions, but preferably is formed with a labyrinth having sequentially closing clearances, as indicated by the different size clearances 2205a, 2205b, in the two fragmentary views of FIGS. 16a and 16b, respectively. As shown, the two groups of teeth 2211, 2212 of relatively elastic material are integrally formed with an underlayer 2215 of the relatively elastic material; and the two ribs 2111, 2112 of relatively inelastic material are joined by the web 2113 to which the relatively elastic material is applied.

Figure 17A:
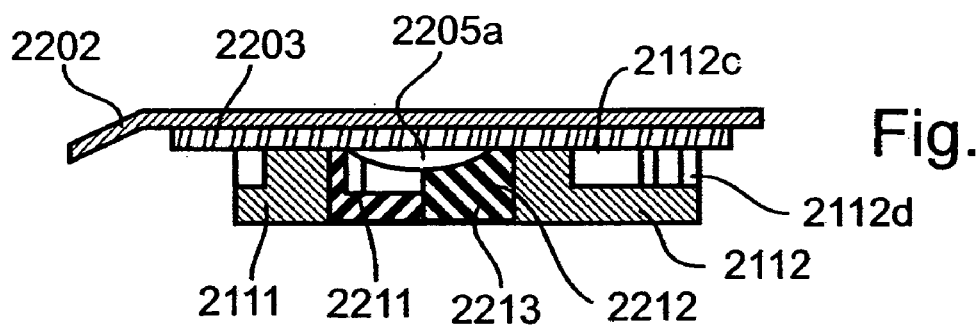
FIGS. 17*a* and 17*b* are views corresponding to FIGS. 16*a* and 16*b* but illustrating a still further construction of drip irrigation tube in accordance with the present invention.
Figure 17B:
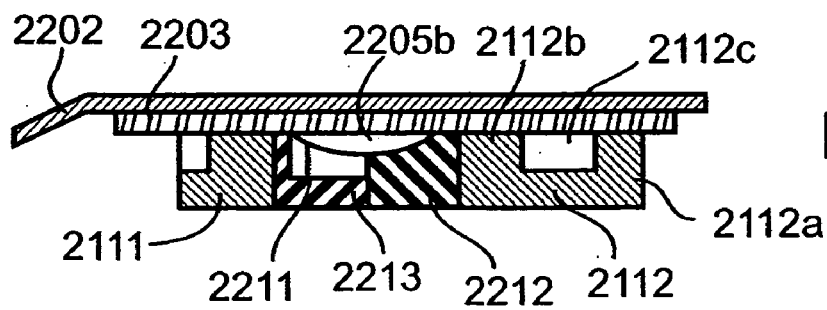

FIGS. 17a and 17b are sectional views, corresponding to FIGS. 16a and 16b, of a drip irrigation hose wherein the two strips 2111, 2112, of relatively inelastic material are not joined by a web, corresponding to web 2113 of relatively inelastic material, as shown in FIGS. 10 and 11. In such a construction, the underlayer 2215 of the relatively elastic material is directly exposed to the water within the drip irrigation hose, thereby making this labyrinth more sensitive to changes in the water pressure for regulating the flow therethrough. This type of construction may be produced by co-extruding the two strips 2111, 2112 of relatively inelastic material in a continuous manner, while either continuously, or intermittently, extruding the relatively elastic material 2215 between the two strips 2111, 2112, such that strip 2215 straddles and is joined to, the two strips 2111, 2112, as described for example with reference to FIG. 20a of the above-cited U.S. Pat. No. 6,371,390.

In both constructions, namely the construction illustrating the underlying web 2113 of relatively inelastic material as shown in FIGS. 15 and 16, or not including that web as shown in FIGS. 17a and 17b, one of the ribs 2112 of relatively inelastic material is constituted of two longitudinally-extending rib sections 2112a, 2112b spaced from each other to define an inlet channel 2112c communicating with each of the emitter elements spaced along the length of the drip irrigation tube. As shown particularly in FIGS. 15, 16a and 17a, the outer rib section 2112a of rib 2112 is formed with a plurality of slots 2112d establishing communication between the interior of the outer tube in the drip irrigation hose and the inlet channel 2112c.

FIGS. 18–27 illustrate further possible constructions of the drip irrigation hose. These constructions relate particularly to the configuration of the relatively inelastic material, (e.g., polyethylene), to have such material define, not only the inlet channels to the labyrinths, but also the outlet channels from the labyrinths to the tube outlet openings (e.g., 48, FIG. 1, or 2104, FIG. 11).

For purposes of example, FIG. 18 illustrates the emitter element, therein generally designated 2300, bonded to the inner surface of an extruded tube 2302 formed with an elongated slot 2304 for each of the tube outlets.

As best seen in FIGS. 18c and 18d, particularly illustrating the construction of each emitter element at the output end of the respective labyrinth, each emitter element includes, as described above with respect to FIGS. 17a and 17b, a formation 2310 of relatively inelastic material (e.g., polyethylene), constituted of two ribs 2311, 2312, straddling the opposite sides of a formation 2320 of relatively elastic material, such as one of the above-described elastomers. The elastomeric material 2320 is shaped to define the two groups of teeth 2321, 2322, and the common underlayer 2323, producing the turbulent flow passageway of the respective labyrinth. One of the ribs 2312 of the relatively inelastic material (e.g., polyethylene) is formed with the two rib section 2312a, 2312b, to define the inlet passageway 2312c (FIG. 18c) between them, as described above with respect to FIGS. 16 and 17, including the slots 2313d in rib section 2312b to serve as the inlets into the inlet passageway 23112c. The inlet passageway 2312c communicates with the inlet end of each labyrinth defined by the teeth 2321, 2322.

In the construction illustrated in FIGS. 18–18d, rib section 2312 of the relatively inelastic material is also shaped to define an outlet passageway, shown at 2312e in FIG. 18c, leading from the outlet end of the respective labyrinth and communicating with its respective outlet opening 2304 in the tube 2302 for discharging the water therefrom at a slow rate. As shown in FIG. 18c, the outlet channel 2312e communicates with its respective outlet opening 2304 via an outlet chamber 2312f also formed in rib section 2312 of the relatively inelastic material 2310.

Outlet chamber 2312f communicates with the outlet end of its respective labyrinth by providing one of the strips 2321 of the relatively elastic material defining one group of teeth, with a U-shaped extension 2324 defining an outlet channel 2325 for the respective labyrinth communicating via an opening 2316 with the respective outlet chamber 2312f.

The construction as illustrated in FIG. 18, and particularly in FIGS. 18c and 18d, provides the important further advantage of enabling the relatively inelastic material 2310 to reinforce each of the outlet openings 2304.

FIG. 19, and its related views of FIGS. 19a–19d, illustrate a drip irrigation hose of basically the same construction as described above with respect to FIG. 18, and therefore its corresponding parts have been correspondingly numbered to facilitate understanding. The construction of FIGS. 19 and 19a–19e, however, provides an additional advantage to the drip irrigation hose, namely the advantage of closing the outlet end of each emitter element until the pressure within the drip irrigation hose is at a minimum positive pressure. Such a feature is advantageous in reducing wastage of water, by blocking water discharge when the hose is not properly pressurized for efficient water distribution, and also in reducing the possibility that external clogging particles may enter the labyrinths of the hose.

To provide the foregoing advantages, the outlet opening 2304, passing through the outlet chamber 2312f of relatively inelastic material, also passes through the adjacent wall of the extension 2324 of relatively elastic material so as to communicate, via chamber 2325, with the outlet end of the respective labyrinth. As shown particularly in FIGS. 19a and 19d, the outlet opening 2304 is of an elongated slit-configuration, and is effected along a line 2304a which forms an angle "α" to a line 2304b (FIG. 19a) extending from the center of the tube 2302 through the flowpath of the respective emitter element.

Figure 20A:
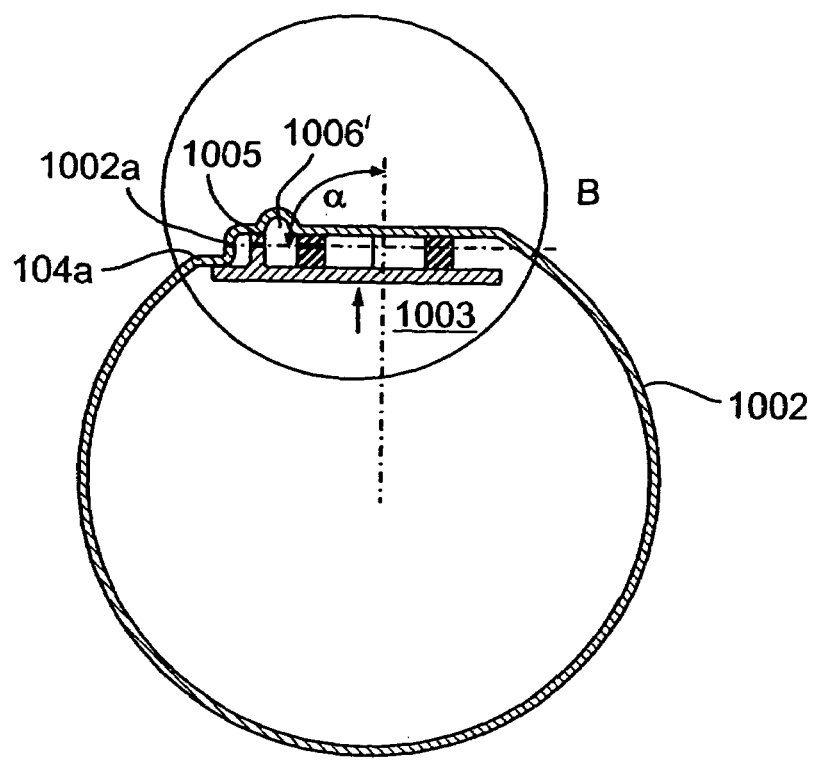

In a conventional drip irrigation hose, the angle "α" is zero degrees; that is, the outlet opening is coaxial with a line from the center of the drip irrigation hose through the flowpath of the respective emitter element. In the construction illustrated in FIGS. 19a and 19d, however, angle "α" is not zero, but is preferably from 15–90°. In FIG. 19a, it is shown as being approximately 60°. FIG. 20a, described below, illustrates a construction wherein "α" is about 90°.

When opening 2324a of such slit opening is formed at angle "α" through extension wall 2324 of relatively elastic material, the thickness of the latter wall can be dimensioned such that this opening is normally closed, but automatically opens when the pressure within the respective labyrinth exceeds a predetermined value. As shown in FIGS. 19d and 19c, such a slit-configuration opening 2324a formed in wall 2324 thus acts like a one-way valve, being normally closed against the entry of clogging material or the exit of water therefrom, until the water pressure within the respective labyrinth reaches a predetermined minimum value, whereupon it automatically opens to discharge water through the respective outlet opening 2304.

FIGS. 20 and 20a–20c illustrate the foregoing feature implemented in another construction of a drip irrigation hose, similar to the hose illustrated in FIGS. 15, 16, and 18 in the above-cited U.S. Pat. No. 6,371,390. To facilitate understanding, the same reference numerals have been used for corresponding elements.

Briefly, and as more particularly described therein, the outer tube is an extruded tube 1002 and has bonded, to its inner surface, a composite strip 1003 formed with a continuous rib 1005 of the relatively inelastic material, (e.g., polyethylene) and with a plurality of emitter elements 1004 each including a pair of longitudinally-extending strips 1045, 1046, of relatively elastic material (e.g., an elastomer) formed with the alternatingly projecting teeth to define the labyrinth-type turbulent flow passage. The outer tube 1002 is formed with a slack 1006 permitting the tube to be slightly expanded, when pressurized, thereby producing a tangential force with respect to the strips 1045, 1046 of relatively elastic material, to change the turbulent flow passageway produced therebetween when the tube is pressurized, as more particularly described in that patent application.

Figure 20B:
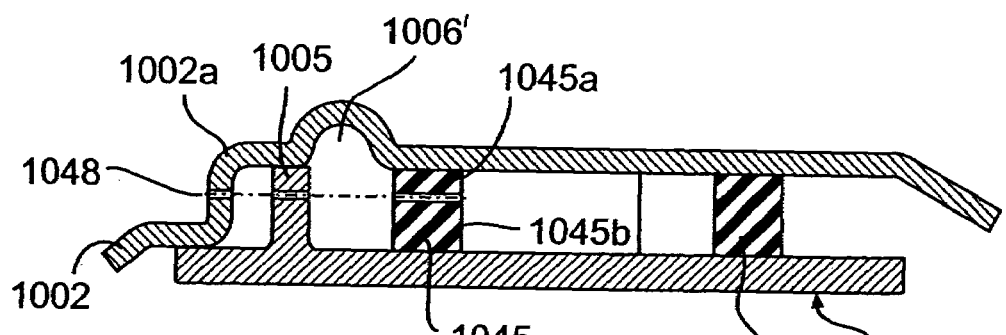
Figure 20C:
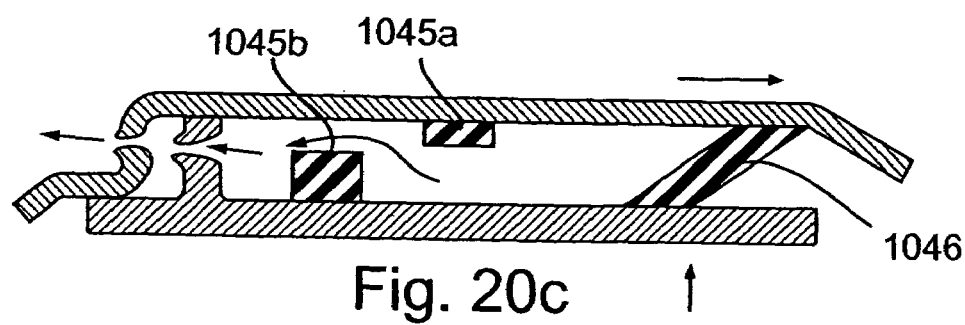

In the drip irrigation hose illustrated in FIGS. 20–20c, the slack permitting expansion of the tube when pressurized extends outwardly, as shown at 1006', rather than inwardly. In addition, the outer tube 1002 includes an inwardly-extending step as shown at 1002a between slack 1006' and the composite emitter strip 1003.

As shown in FIGS. 20a and 20b, the outlet opening 1048 is formed as an elongated slit through the inwardly-extending step 1002a of the outer tube 102, through rib 1005 of the relatively inelastic material and through wall 1045 of the relatively elastic material. Outlet opening 1048 is of an elongated slit-formation, as described above with respect to FIGS. 19 and 19a–19e. whereas in the latter Figs. the outlet opening (2304) was at an angle "α" of about 60° with respect to a line from the center of the tube perpendicularly through the flow path of the respective emitter element, in the construction of FIGS. 20–20c, angle "α" is 90° (as shown in FIG. 20a). Slit opening 104a is of a length such that, when it passes through wall 1045 of the relatively elastic material, it splits the latter wall into two sections 1045a, 1045b which normally engage each other (as shown in FIG. 20b), but which move apart, as shown in FIG. 20c, when the hose is pressurized. Slit opening 1048 through wall 1045 of the relatively elastic material thus serves as a one-way valve which is normally closed (FIG. 20b) to block the communication from the outlet end of the respective labyrinth to the outlet opening 1048. However, when the pressure within the hose builds up, slack 1006' permits the outer tube to expand, thereby moving the two sections 1045a, 1045b of resilient wall 1045 apart, (FIG. 20c), opening the passage from the emitter element to the respective outlet opening 1048 to produce a discharge of the water therefrom.

Thereafter, the shape of the labyrinth defined by the two strips 1045, 1046 of relatively elastic material changes in response to the pressure to regulate the water flow through the respective labyrinth in response to water pressure.

FIGS. 21 and 22 illustrate another emitter strip, generally designated 3300, also constituted of two co-extruded inelastic strips 3311, 3312, on opposite sides of an elastic strip 3320. Non-elastic strip 3312 is formed with the inlet slits 3312 to the respective labyrinth. The elastic strip 3320 is formed with the teeth 3321 defining the respective labyrinth, and with a rib 3324 to define, on one side thereof, an outlet chamber 3325a communicating with the outlet end of the labyrinth, and on the opposite side, an outlet chamber 3325b communicating with an outlet chamber 3312f of the inelastic material, which communicates with the outlet slit through the tube (e.g., slit 2304 of tube 2302, FIG. 19d). In the emitter structure illustrated in FIGS. 21 and 22, rib 3324 is formed with an elongated slit 3324a, corresponding to slit 2324a in FIG. 19d, serving as a one-way valve normally closing the outlet end of the respective emitter element until the pressure within the drip irrigation hose is at a minimum positive pressure. In the illustrated construction, slit 3324a extends substantially perpendicularly to the inner surface of the tube (e.g., 2302, FIG. 19d).

It will thus be seen that the construction illustrated in FIGS. 21 and 22 operates in the same manner as described above, e.g., with respect to FIGS. 19a–19e, in that slit 3324a is normally closed, to thereby close the passage from the outlet end of the labyrinth defined by teeth 3321 to the outlet chamber 3325b, communicating with the outlet chamber 3312f of the inelastic strip 3312, which in turn communicates with the outlet opening through the tube (outlet opening 2304 in tube 2302, FIG. 19d). However, when the pressure within the drip irrigation hose reaches a minimum positive pressure, slit 3324a opens and thereby permits the passage of the water from the labyrinth to the outlet opening 2304 via chambers 3325b and 3312f.

As noted above, in the closed condition of slit 3324a, it is not necessary that it completely block any flow therethrough, since some leakage can usually be tolerated.

FIG. 23 illustrates a similar construction as in FIGS. 21 and 22, but in this case each of the openings through wall 3324 of the elastic material is in the form of an elongated slit 3324b extending substantially parallel to the inner surface of the outer tube (2302, FIG. 19d). The emitter illustrated in FIG. 23 is otherwise constructed and operates in the same manner as the emitter element illustrated in FIGS. 21 and 22.

FIG. 24 illustrates another modification in the construction of the emitter elements, particularly in each of the openings through rib 3324 of elastic material to produce the one-way valve action described above. In the construction illustrated in FIG. 24, each of the openings through rib 3324 is in the form of an elongated slit of L-shaped configuration, having a section 3324c extending substantially parallel to the inner surface of the outer tube, joined at one end by another section 3324d extending substantially perpendicularly to the inner surface of the outer tube.

The slit through the blocking rib (3324) may take other configurations. Examples of various non-linear configurations that can be used are illustrated by slit 3324e in FIGS. 25 and 26, by slit 3324f in FIG. 27, and by slit 3324g in FIG. 28. While it is preferable to form the blocking rib 3324, together with its slit (e.g., 3324b), at the outlet end of its respective labyrinth, actually it may be formed anywhere between the inlet end of its respective labyrinth and the tube outlet (e.g., 2304, FIG. 19b) for the respective labyrinth.

FIGS. 29, 30 and 30a illustrate another construction of emitter strip, therein generally designated 4300, wherein the complete strip is of elastic material; that is, the emitter strip 4300 illustrated does not include a portion of inelastic material, as in the previously-described constructions. In this case, the rib 4324 formed with the slit 4324e is also at the outlet end of the respective labyrinth, dividing the labyrinth outlet chamber into to sections 4325a, 4325b; but the tube outlet 4304 of the tube 4302 directly communicates with chamber section 4325b of elastic material. As shown in FIG. 30a, slit 4324e is preferably inclined with respect to the inner surface of tube 4302. An advantage of this construction is that it simplifies the extrusion of the emitter strip, since only one material, namely the elastic material, needs to be extruded; however, a disadvantage of that construction is that the cost of the emitter strip is increased because of the greater amount of the more expensive elastic material used in the emitter strip.

FIG. 31 illustrates one manner of producing the emitter strip 4300 of FIGS. 29, 30 and 30a. Thus, as shown in FIG. 31, a strip 4301 of relatively elastic material is extruded by extruder 4350 and formed into the emitter elements by an embossing wheel 4360, which also forms the blocking rib 4324 at the outlet end of each emitter element. The slit through the blocking rib 4324 (e.g., of any one of the configurations illustrated above at 3324a–3324g) is produced by any suitable means downstream of the embossing wheel 4360, e.g., by a knife 4370, laser, or the like. After the strip 4300 is thus, formed, it is then bonded to the inner surface of the tube, as shown at 4302 in FIG. 32, after which the tube is formed with the outlet slits 4304.

FIGS. 33 and 34 illustrate a further construction of emitter strip, therein designated 5300, constituted of three co-extruded strips, namely inelastic strips 5311 and 5312 co-extruded with, and on opposite sides of, elastic strip 5320. In this case, however, only the tips of the teeth 5321 are made of elastic material; the remainder of the emitter strip 5300 is constituted of the two inelastic strips 5311, 5312, co-extruded on opposite sides of the elastic strip 5320. An advantage of this construction is the reduced cost since the more expensive elastomeric material is used only with respect to the tips of the teeth 5321 of the labyrinths.

FIG. 35 illustrates a further variation, wherein the emitter strip, therein designated 6300, is applied to the inner surface of a tube 6302 in the form of a seamed tube, rather than an extruder tube. As shown in FIG. 35, the outlet 6304 through the tube for each of the emitter elements is in the form an elongated slit, and is preferably located on the side of the tube opposite to its seam 6305.

While the invention has been described with respect to several preferred embodiments, it will be appreciated that these are set forth merely for purposes of example, and that many other variations, modifications and applications of the invention may be made.

What is claimed is:

1. A drip irrigation hose, comprising:
   a tube for conducting pressurized water through its interior and formed with a plurality of tube outlets for discharging water at longitudinally-spaced locations along the length of the tube;
   and a plurality of emitter elements secured within said tube at longitudinally-spaced locations along its length to define a plurality of labyrinths each having an inlet end in communication with the interior of the tube, and an outlet end in communication with a said tube outlet for discharging water therefrom at a slow rate;
   said plurality of emitter elements including a relatively elastic material shaped in the form of at least the tips of a plurality of groups of teeth, each group defining a said labyrinth at each of said longitudinally spaced locations along the length of said tube;
   said plurality of emitter elements further including a continuous strip of a relatively inelastic material shaped to define at least an outlet passageway for each labyrinth connecting its outlet end to a said tube outlet for discharging the water therefrom.

2. The drip irrigation hose according to claim 1, wherein said continuous strip of relatively inelastic material also includes a continuous rib defining an inlet passageway and formed with a plurality of slots for each of said labyrinths establishing communication between the respective labyrinth and the interior of said tube.

3. The drip irrigation hose according to claim 1, wherein said outlet passageway defined by said relatively inelastic material includes an outlet chamber communicating with each of said tube outlets for discharging water therefrom.

4. The drip irrigation hose according to claim 1, wherein said relatively inelastic material includes a rib formation configured to define, with the inner surface of the tube, said outlet passageway and an outlet chamber therein at the outlet end of each labyrinth.

5. The drip irrigation hose according to claim 1, wherein each of said tube outlets is in the form of an opening passing through said tube and through said relatively inelastic material at the outlet passageway for the respective labyrinth.

6. The drip irrigation hose according to claim 5, wherein each of said openings passing through said tube also passes through a wall of relatively elastic material.

7. The drip irrigation hose according to claim 6, wherein each of said openings through said wall of relatively elastic material is of an elongated slit configuration.

8. The drip irrigation hose according to claim 7, wherein each of said openings through said wall of relatively elastic material extends at an angle "α" of 15°–90° with respect to a line extending from the center of said tube perpendicularly through the respective labyrinth.

9. The drip irrigation hose according to claim 7, wherein said tube is formed with an inwardly-extending step aligned with said outlet chambers, and each of said outlet openings extends through said step, through the wall of said relatively inelastic material defining said outlet chamber, and through a wall of said relatively elastic material at the end of the respective labyrinth at an angle "α" which is substantially 90° with respect to a line extending from the center of said tube perpendicularly through the respective labyrinth.

10. The drip irrigation hose according to claim 7, wherein each of said openings through said wall of relatively elastic material splits said wall into two parts such that both parts engage each other in the non-pressurized condition of the tube for normally closing the respective opening, but move tangentially apart to open the respective opening when the water pressure within the tube at the respective labyrinth reaches a predetermined minimum.

11. A drip irrigation hose, comprising:
a tube for conducting pressurized water through its interior and formed with a plurality of tube outlets for discharging water at longitudinally-spaced locations along the length of the tube;
and a plurality of emitter elements secured within said tube at longitudinally-spaced locations along its length to define, with an inner surface of said tube, a plurality of labyrinths each having an inlet end in communication with the interior of the tube, and an outlet end in communication with a said tube outlet for discharging water therefrom at a slow rate;
said plurality of emitter elements including a continuous strip of a relatively inelastic material bonded to an inner surface of said tube, and a relatively elastic material shaped to define at least the tips of teeth of a labyrinth at each of said longitudinally spaced locations along the length of said tube;
said relatively elastic material being formed with an opening therethrough for each of said labyrinths, each of said openings being located between said emitter inlet and said tube outlet for the respective labyrinth;
each of said latter openings automatically opening when the water pressure within the tube at the respective labyrinth reaches a predetermined minimum.

12. The drip irrigation hose according to claim 11, wherein each of said openings through said wall of relatively elastic material is of an elongated slit configuration.

13. The drip irrigation hose according to claim 12, wherein each of said openings through said wall of relatively elastic material extends at an angle "α" of 15°–90° with respect to a line extending from the center of said tube perpendicularly through the respective labyrinth.

14. The drip irrigation hose according to claim 12, wherein said tube is formed with an inwardly-extending step aligned with said outlet chambers, and each of said outlet openings extends through said step, through the wall of said relatively inelastic material defining said outlet chamber, and through a wall of said relatively elastic material at the end of the respective labyrinth at an angle "α" which is substantially 90° with respect to a line extending from the center of said tube perpendicularly through the respective labyrinth.

15. The drip irrigation hose according to claim 12, wherein each of said openings through said wall of relatively elastic material splits said wall into two parts such that both parts engage each other in the non-pressurized condition of the tube for normally closing the respective opening, but move tangentially apart to open the respective opening when the water pressure within the tube at the respective labyrinth reaches a predetermined minimum.

16. The drip irrigation hose according to claim 12, wherein each of said openings through said wall of elastic material is in the form of an elongated slit extending substantially perpendicularly to the inner surface of said tube.

17. The drip irrigation hose according to claim 12, wherein each of said openings through said wall of elastic material is in the form of an elongated slit extending at an incline to the inner surface of said tube.

18. The drip irrigation hose according to claim 12, wherein each of said openings through said wall of elastic material is in the form of an elongated L-shaped slit having a first section extending substantially parallel to the inner surface of said tube and joined one to another section extending substantially perpendicularly to the inner surface of said tube.

19. The drip irrigation hose according to claim 11, wherein each of said openings is located between the outlet end of the respective labyrinth and the tube outlet for the respective labyrinth.

20. A drip irrigation hose, comprising:
a tube for conducting pressurized water through the interior of the tube and formed with a plurality of tube outlets for discharging the water at longitudinally-spaced locations along the length of the tube;
and a plurality of emitter elements secured to said tube at longitudinally-spaced locations along its length to define, with an inner surface of said tube, a plurality of labyrinths each having an inlet in communication with the interior of the tube and an outlet in communication with a tube outlet for discharging water from the tube outlet at a slow rate;
said emitter elements including a continuous strip bonded to the inner surface of said tube and formed with teeth along the length of said continuous strip defining said plurality of labyrinths with the inner surface of said tube;
at least the tips of the teeth of said continuous strip being of a relatively elastic material;

said continuous strip being further formed with a rib of said relatively elastic material for each labyrinth in the flow path from the respective emitter inlet to the respective tube outlet;

each of said ribs being formed with a slit which automatically opens when the water pressure within the tube at the respective labyrinth reaches a predetermined minimum to permit flow from the respective emitter inlet to the respective tube outlet.

21. The drip irrigation hose according to claim 20, wherein said continuous strip is completely made of said relatively elastic material.

22. The drip irrigation hose according to claim 20, wherein said continuous strip is made of relatively inelastic material except for said teeth and ribs which are made of said relatively elastic material.

23. The drip irrigation hose according to claim 20, wherein at least a part of each of said slits extends substantially perpendicularly to the inner surface of said tube.

24. The drip irrigation hose according to claim 20, wherein at least a part of each of said slits extends at an incline to the inner surface of said tube.

25. The drip irrigation hose according to claim 20, wherein each of said slits is of a non-linear shaped configuration.

26. The drip irrigation hose according to claim 20, wherein each of said ribs is located between the outlet end of the respective labyrinth and the tube outlet for the respective labyrinth.

27. The drip irrigation hose according to claim 20, wherein said tube is an extruded tube.

28. The drip irrigation hose according to claim 20, wherein said tube is a seamed tube.

29. A drip irrigation hose, comprising:

a tube for conducting pressurized water through the interior of the tube and formed with a plurality of tube outlets for discharging the water at longitudinally-spaced locations along the length of the tube;

and a plurality of emitter elements secured to said tube at longitudinally-spaced locations along its length to define, with an inner surface of said tube, a plurality of labyrinths each having an inlet in communication with the interior of the tube and an outlet in communication with a tube outlet for discharging water from the tube outlet at a slow rate;

said emitter elements including a continuous strip bonded to the inner surface of said tube and formed with teeth along the length of said continuous strip defining said plurality of labyrinths with the inner surface of said tube;

said continuous strip being of a relatively elastic material and further formed with a rib for each labyrinth in the flow path from the respective emitter inlet to the respective tube outlet;

each of said ribs being formed with a slit automatically opens when the water pressure within the tube at the respective labyrinth reaches a predetermined minimum to permit flow from the respective emitter inlet to the respective tube outlet.

30. The drip irrigation hose according to claim 29, wherein at least a part of each of said slits extends substantially perpendicularly to the inner surface of said tube.

31. The drip irrigation hose according to claim 29, wherein at least a part of each of said slits extends at an incline to the inner surface of said tube.

32. The drip irrigation hose according to claim 29, wherein each of said slits is of a non-linear shaped configuration.

33. The drip irrigation hose according to claim 29, wherein each of said ribs is located between the outlet end of the respective labyrinth and the tube outlet for the respective labyrinth.

34. The drip irrigation hose according to claim 29, wherein said tube is an extruded tube.

35. The drip irrigation hose according to claim 29, wherein said tube is a seamed tube.

36. A method of making a drip irrigation hose including a tube:

a tube for conducting pressurized water through the interior of the tube and formed with a plurality of tube outlets for discharging the water at longitudinally-spaced locations along the length of the tube;

and a plurality of emitter elements secured to said tube at longitudinally-spaced locations along its length to define, with an inner surface of said tube, a plurality of labyrinths each having an inlet in communication with the interior of the tube and an outlet in communication with a tube outlet for discharging water from the tube outlet at a slow rate; said method comprising:

forming a continuous strip with a plurality of groups of teeth to define said plurality of labyrinths with the inner surface of said tube, when secured thereto, and also to define a rib in the flow path of each labyrinth from the respective emitter inlet to the respective tube outlet;

forming a slit in each of said ribs configured so as to automatically open with an increase in water pressure at the respective labyrinth; and bonding said continuous strip to the inner surface of said tube.

37. The method according to claim 36, wherein said slits are cut by a knife.

38. The method according to claim 36, wherein said slits are cut by a laser beam.

39. The method according to claim 36, wherein said tube is extruded around said continuous strip, and the continuous strip is bonded to the inner surface of the extruded tube.

40. The method according to claim 36, wherein said continuous strip is bonded to a plastic sheet, which sheet is then formed into a tube having overlapping edges, which edges are seamed.

* * * * *